United States Patent [19]

Larson

[11] Patent Number: 5,097,437

[45] Date of Patent: Mar. 17, 1992

[54] CONTROLLER WITH CLOCKING DEVICE CONTROLLING FIRST AND SECOND STATE MACHINE CONTROLLER WHICH GENERATE DIFFERENT CONTROL SIGNALS FOR DIFFERENT SET OF DEVICES

[76] Inventor: Ronald J. Larson, 5409 James Ave. S., Minneapolis, Minn. 55419

[21] Appl. No.: 217,542

[22] Filed: Jul. 17, 1988

[51] Int. Cl.⁵ .................. G06F 9/00; G06F 13/10
[52] U.S. Cl. .................. 395/775; 364/240; 364/242.6; 364/271; 364/927.92; 364/935.4; 364/949.6; 364/950; 364/DIG. 1; 364/DIG. 2; 395/500

[58] Field of Search ... 364/200 MS File, 900 MS File

[56] References Cited

U.S. PATENT DOCUMENTS

| | | | |
|---|---|---|---|
| 4,590,551 | 5/1986 | Mathews | 364/200 |
| 4,779,089 | 10/1988 | Theus | 364/200 |
| 4,805,137 | 2/1989 | Grant et al. | 364/900 |
| 4,831,520 | 5/1989 | Rubinfeld et al. | 364/200 |
| 4,843,544 | 6/1989 | DuLac et al. | 364/200 |
| 4,864,496 | 9/1989 | Triolo et al. | 364/200 |
| 4,989,203 | 1/1991 | Phinney | 370/85.130 |
| 4,993,023 | 2/1991 | Phinney | 370/85.130 |

OTHER PUBLICATIONS

J. Theus et al, "Futurebus anticipates coming needs", *Electronics International*, Jul. 1984, New York, pp. 108-112, vol. 57.

D. M. Taub, "Arbitration and Control Acquisition in the Proposed IEEE 896 Futurebus", *IEE Micro*, vol. 4, No. 4, Aug. 84, pp. 28-41.

"VME bus requester releases bus four ways", *Electrical Design News*, vol. 2, No. 8, Aug. 1985, pp. 241-242.

*Primary Examiner*—Thomas C. Lee
*Assistant Examiner*—Ayni Mohamed
*Attorney, Agent, or Firm*—Davis & Schroeder

[57] ABSTRACT

A controller for controlling a microprocessor-based system incorporates two cooperatively operating state machine controllers and is capable of interfacing with bus and memory subsystems while maintaining synchronous handshake with more than one type of microprocessor on a bus which may operate at a different speed than the system memory subsystems and peripheral devices. The controller provides functional and timing parameters to satisfy requirements for an asynchronous bus and for more than one type of device which reside on the bus.

54 Claims, 35 Drawing Sheets

| Pin | Signal | Signal | Pin |
|---|---|---|---|
| 41 | CLKSYS | 286CLK | 37 |
| 45 | SPDSEL | TIMCLK | 33 |
| 46 | CLKPER | SYSCLK | 34 |
| 40 | CLKDSK | SERCLK | 39 |
| 47 | SELSP0 | DSKCLK | 38 |
| 23 | CLK286 | | |
| 26 | KYBRST | SYSRST | 32 |
| 25 | TEST | RESET286 | 31 |
| 24 | RESET | CA0 | 6 |
| 59 | WS8 | CA20 | 7 |
| 58 | WS4 | | |
| 57 | WS2 | BUSY | 8 |
| 56 | WS1 | READY | 30 |
| 12 | MMCS16 | ALE | 44 |
| 11 | IOCS16 | CONAN | 62 |
| 13 | MM0 | READYL | 9 |
| 14 | MM1 | FIRST | 28 |
| 18 | LMEM | DT | 27 |
| 17 | MEM | | |
| 16 | BHE | RAS2 | 66 |
| 15 | A0 | RAS1 | 67 |
| 52 | A1 | RAS0 | 10 |
| 54 | A20 | CASH | 61 |
| 53 | A20GATE | CASL | 60 |
| 55 | IORDY | MAS | 65 |
| 20 | RDYINP | MEMWRITE | 42 |
| 19 | ALEINP | MEMREAD | 43 |
| 21 | S1 | IOWRITE | 3 |
| 22 | S0 | IOREAD | 2 |
| 51 | REFRESH | INTACK | 29 |
| 50 | AEN1 | | |
| 48 | NPCS | ENX | 64 |
| 49 | ACK | ENR | 63 |
| 68 | VDD1 | ENH | 4 |
| 35 | GND1 | ENL | 5 |

L1A1747

ADDITIONAL GND PIN = 1
ADDITIONAL PWR PIN = 36

FIG. 3

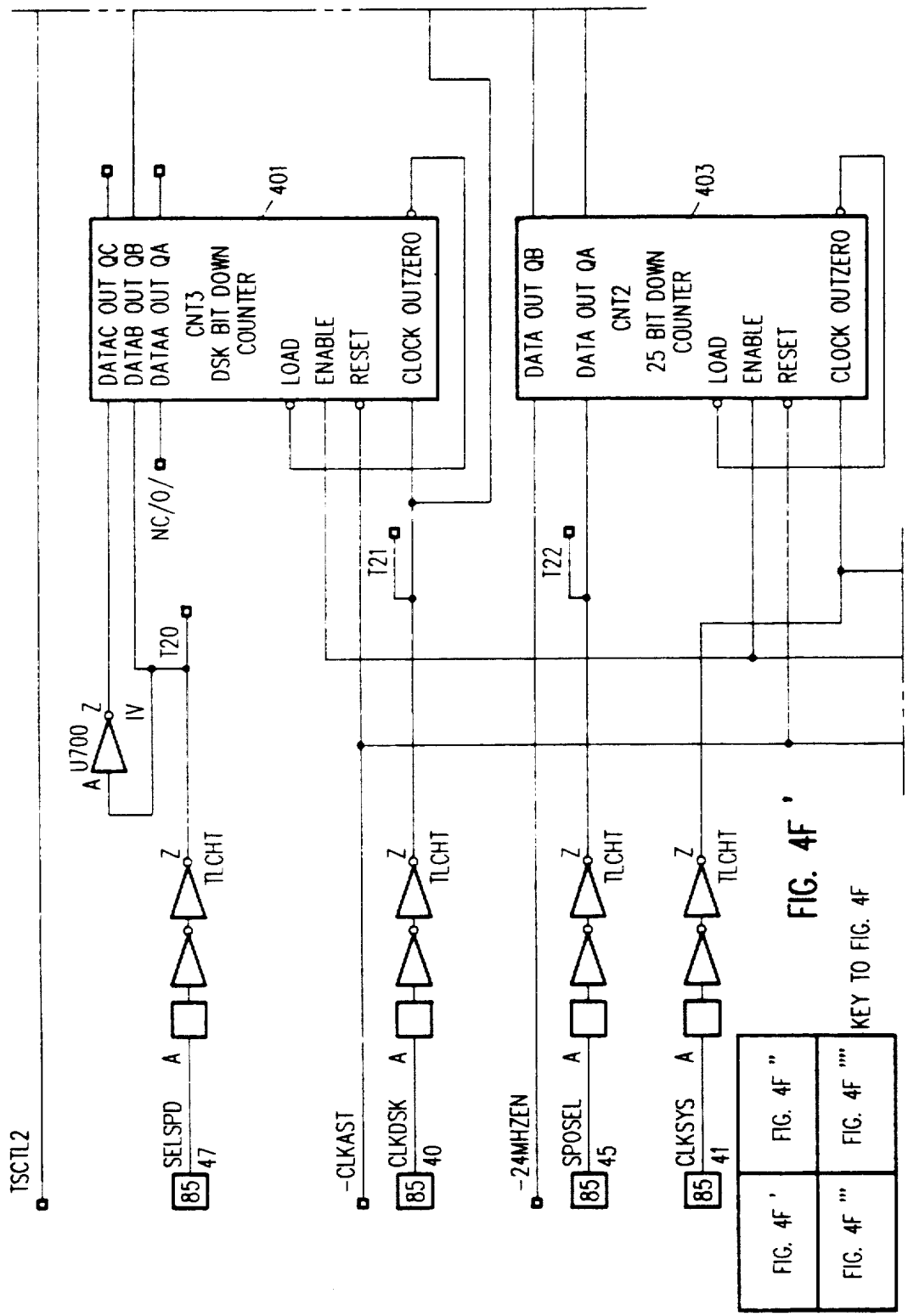

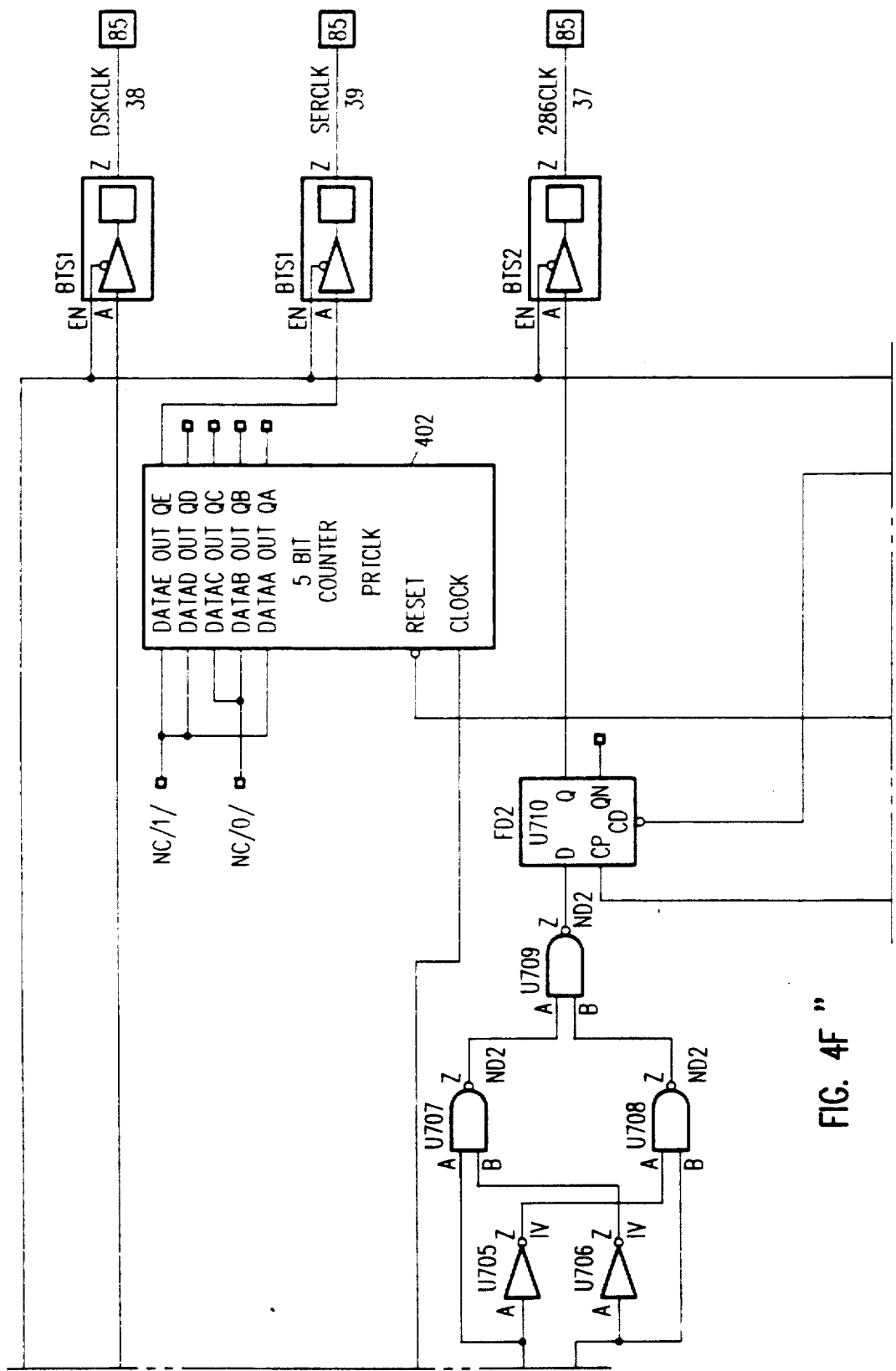
FIG. 4F"

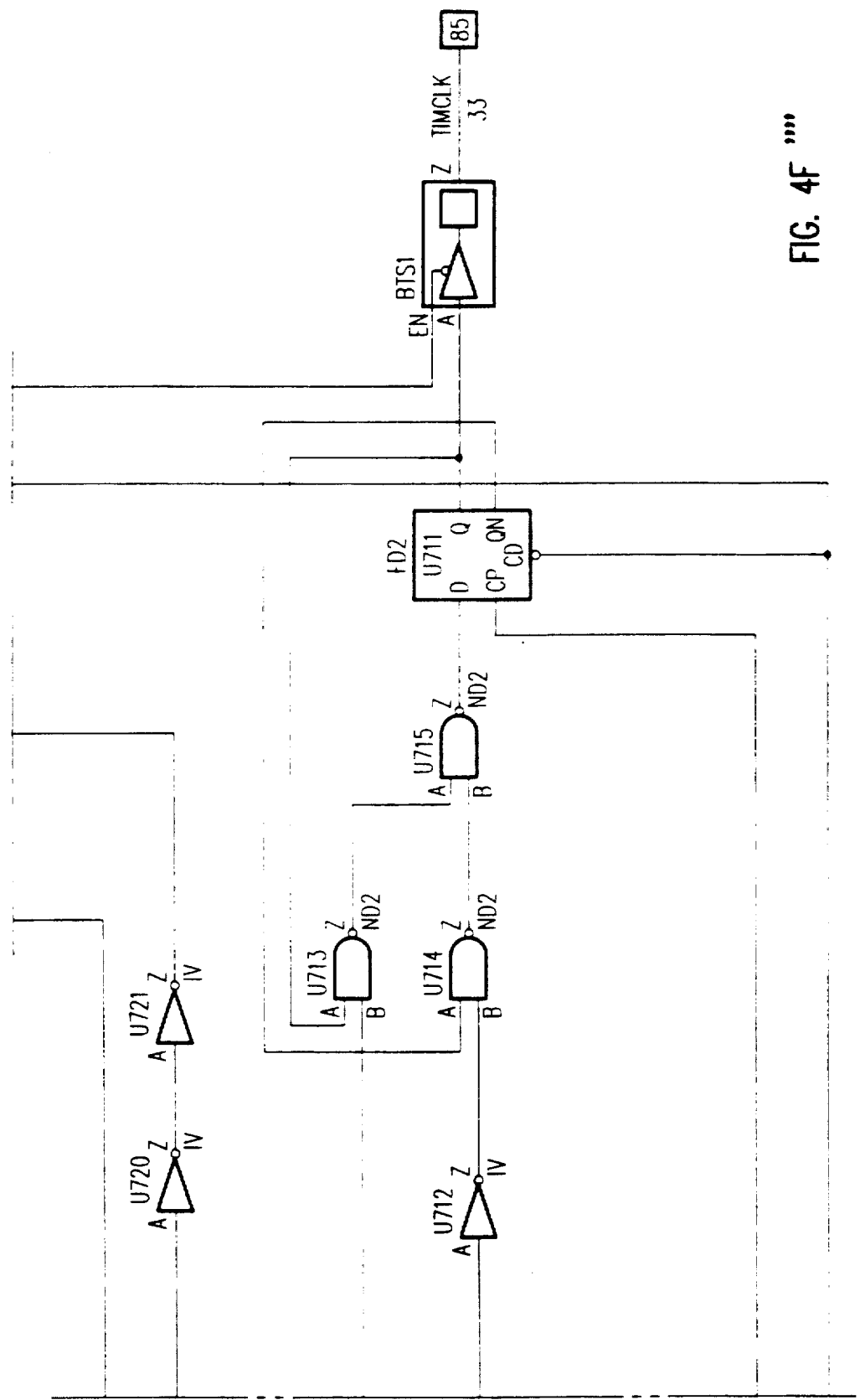
FIG. 4F''''

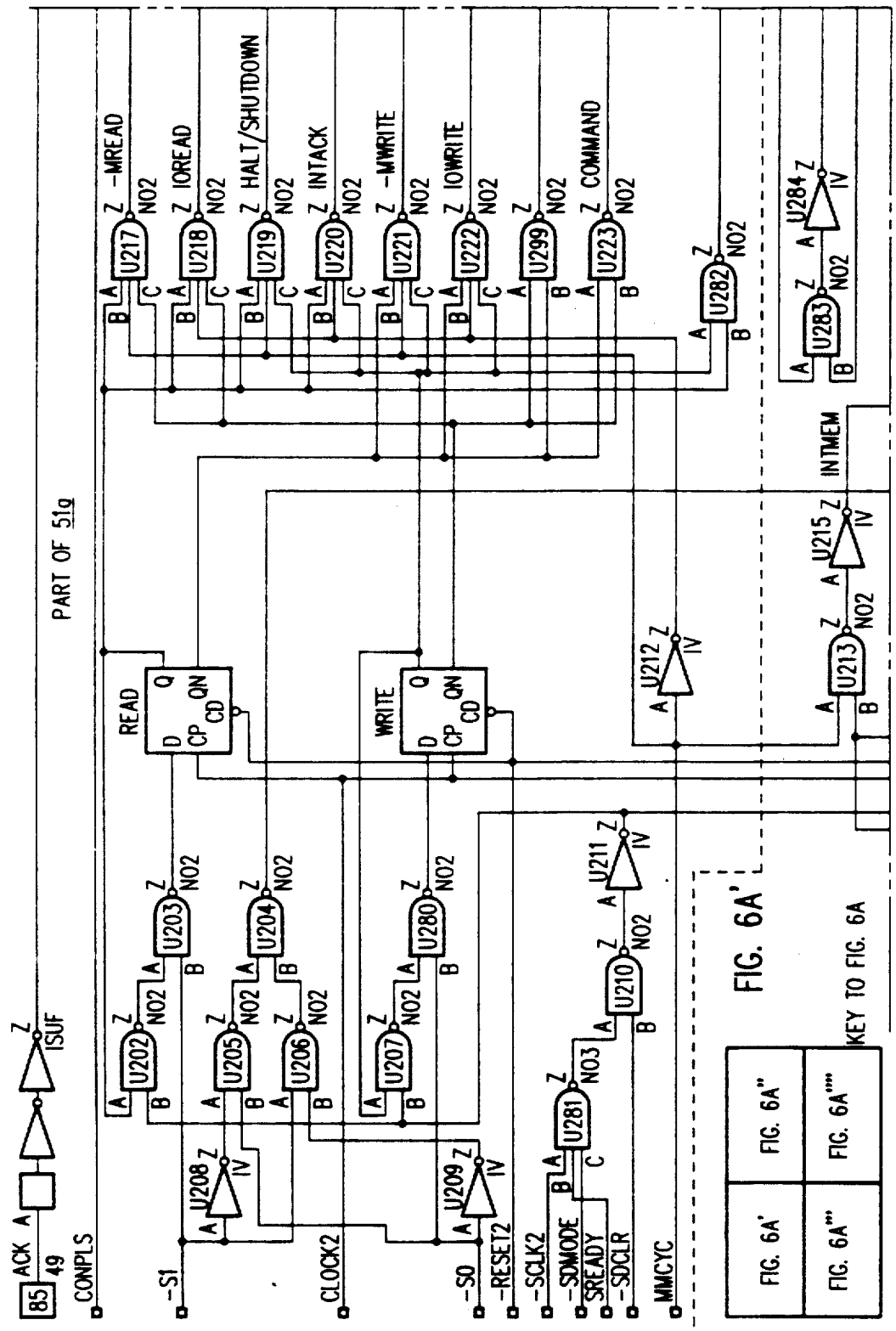

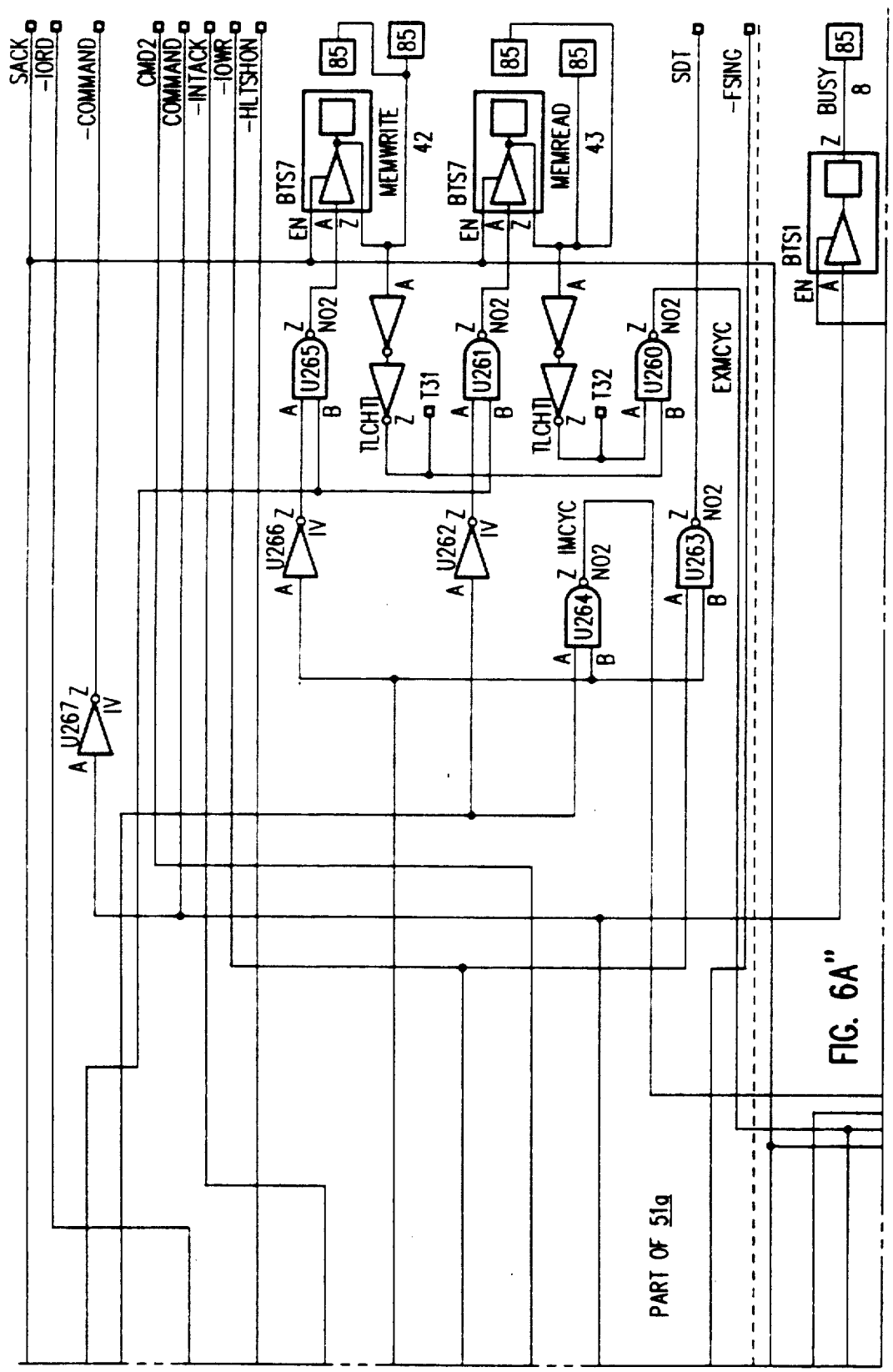
FIG. 6A"

PART OF 51b

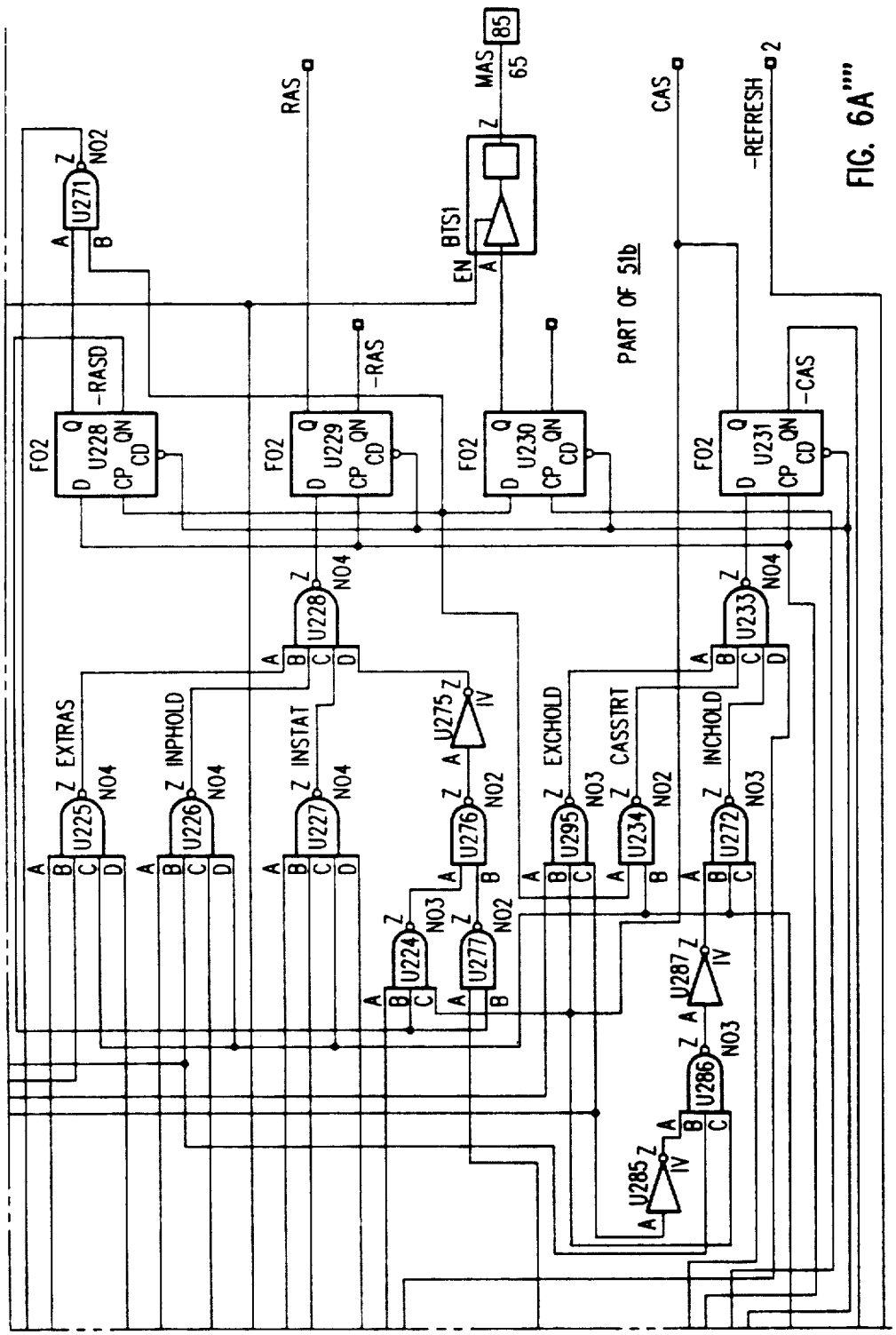

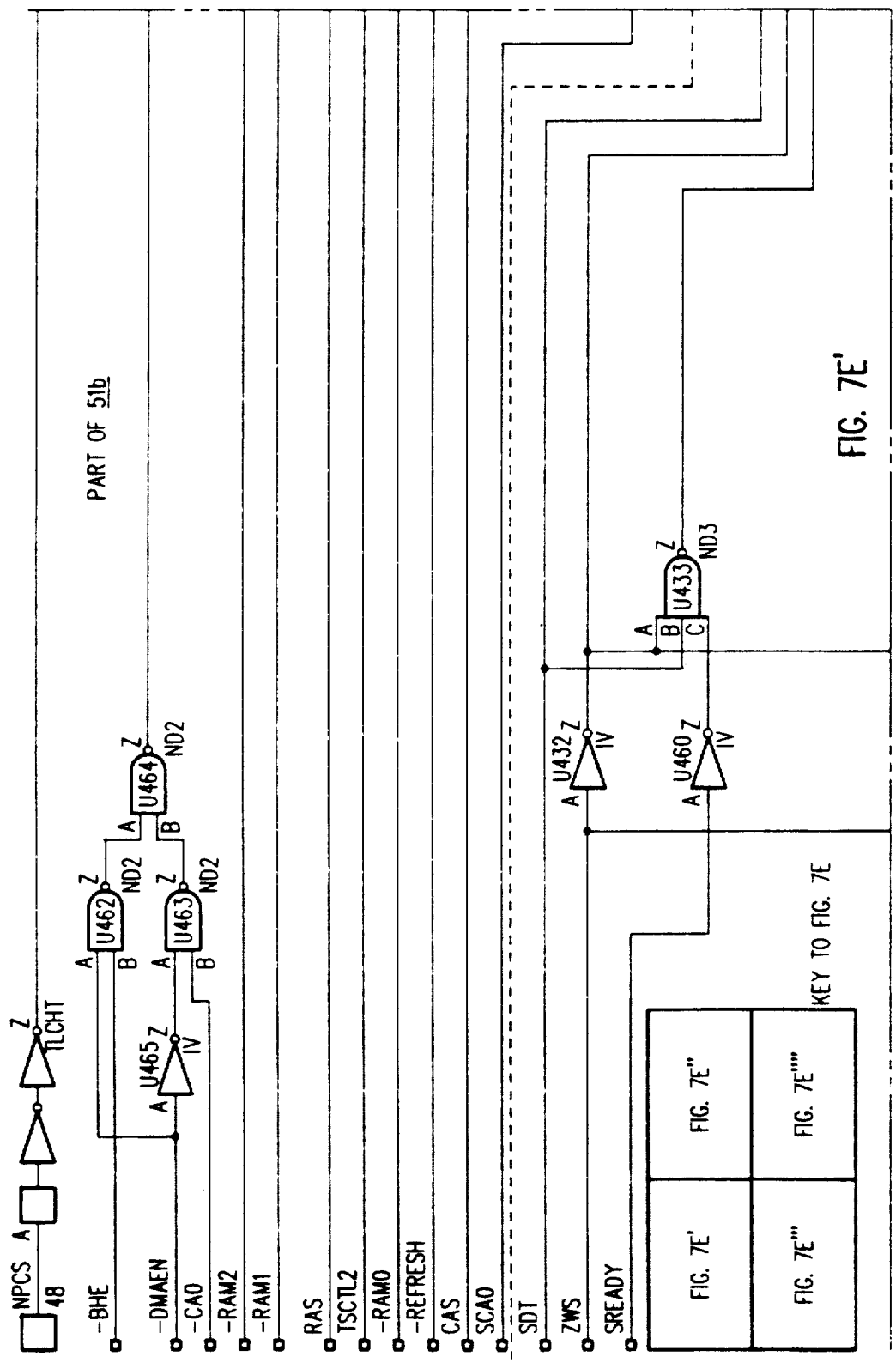

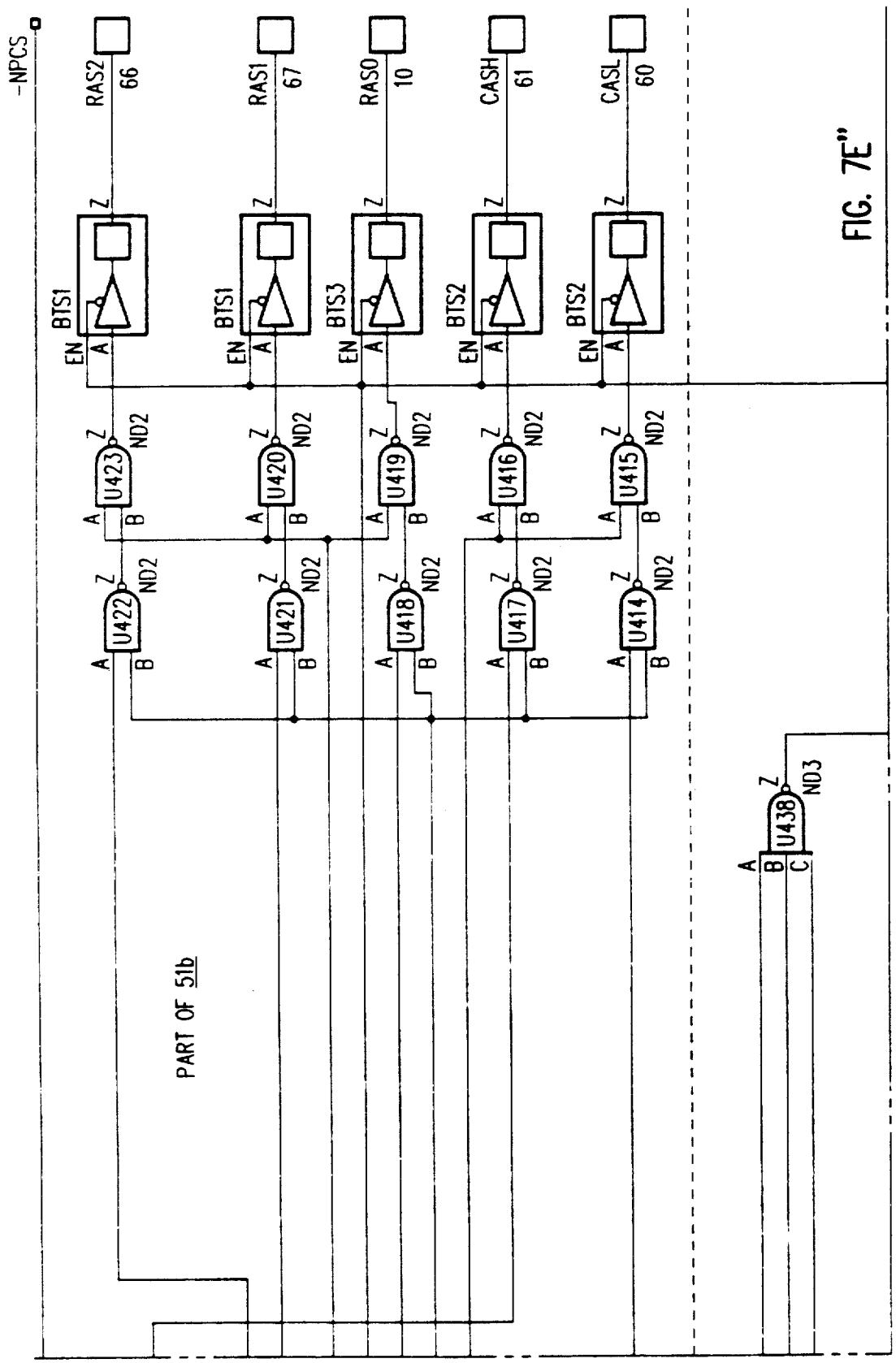
FIG. 7E"

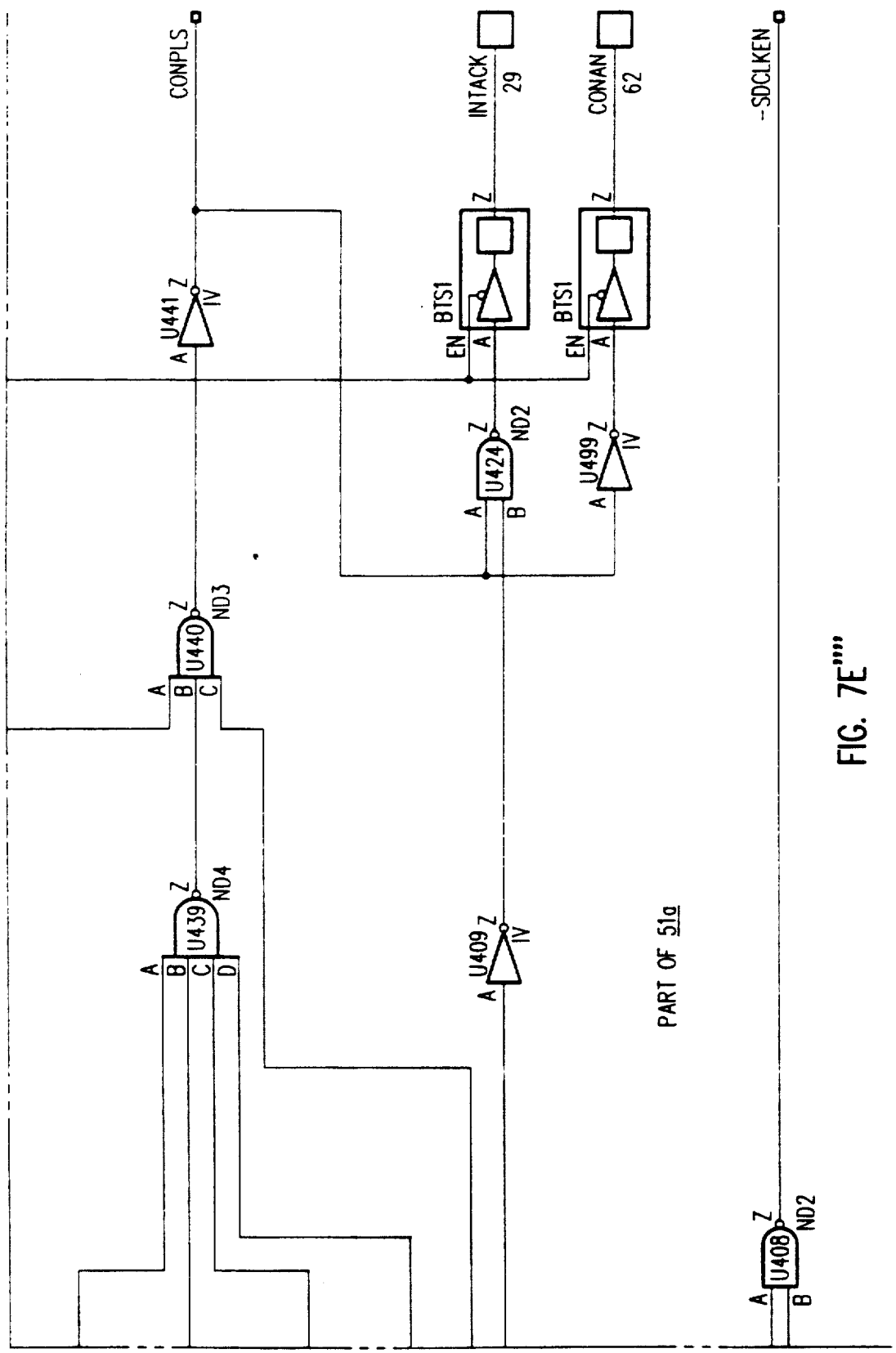
FIG. 7E''''

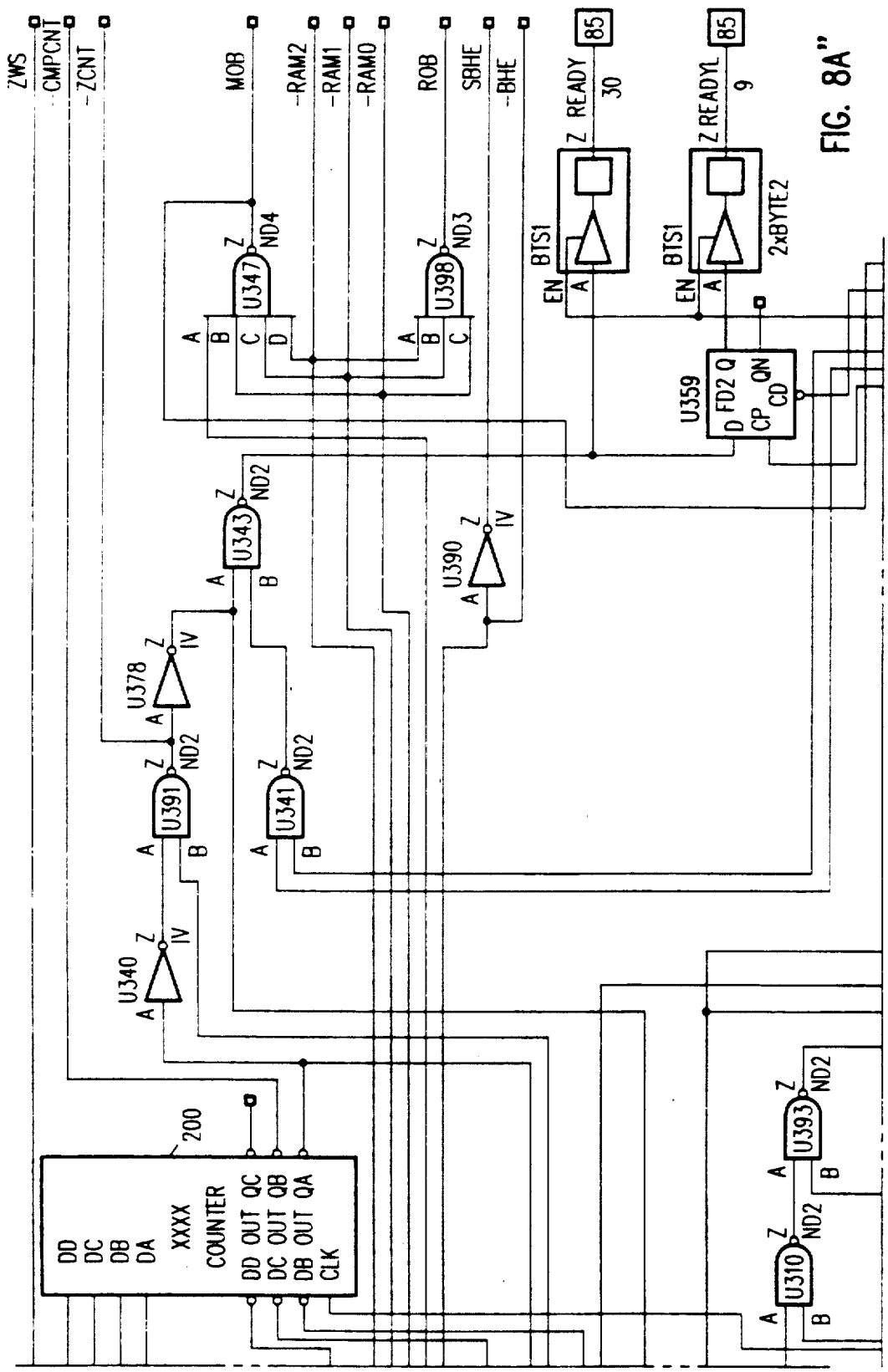

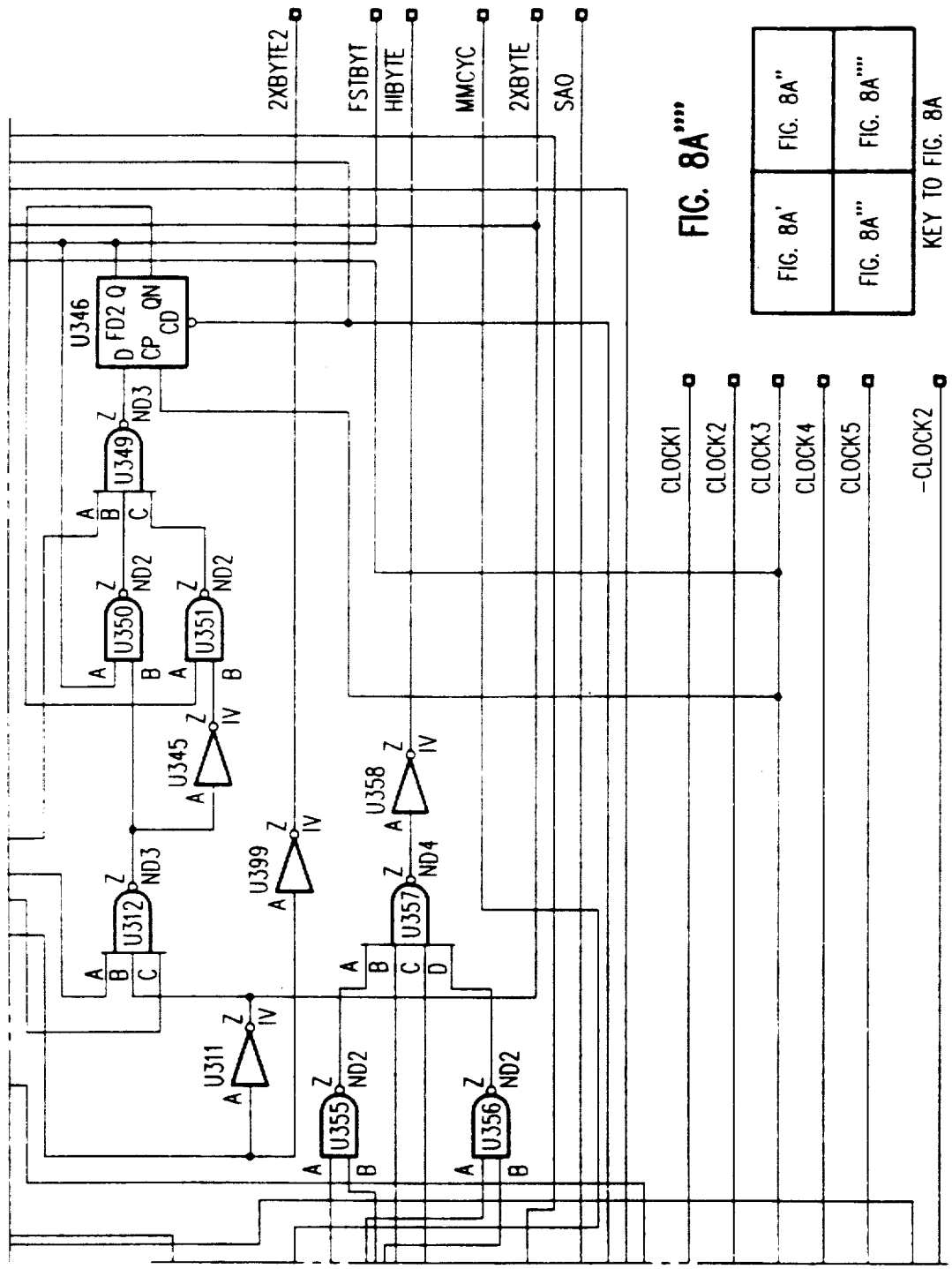

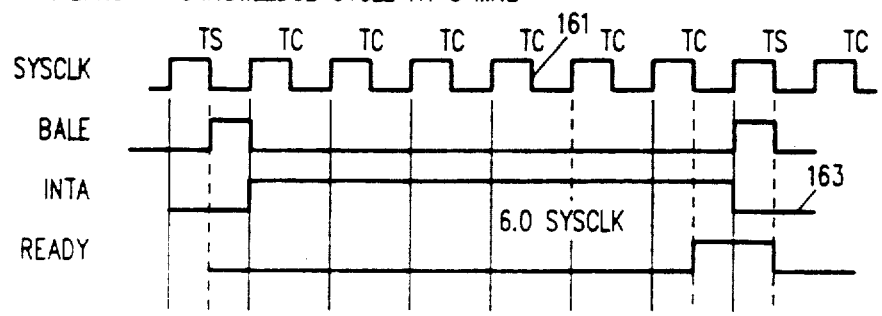
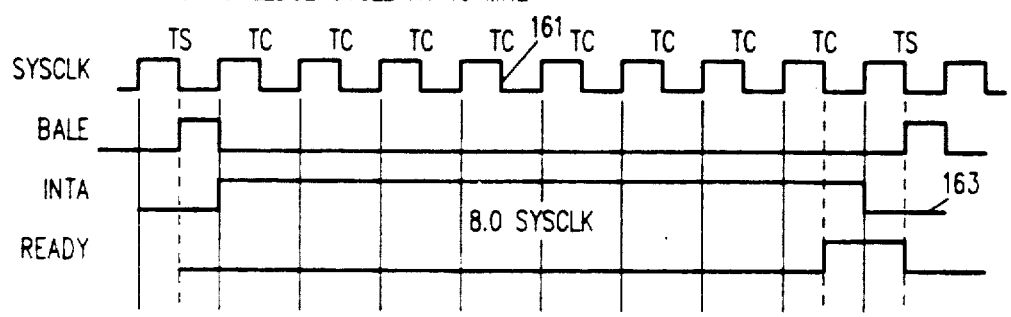
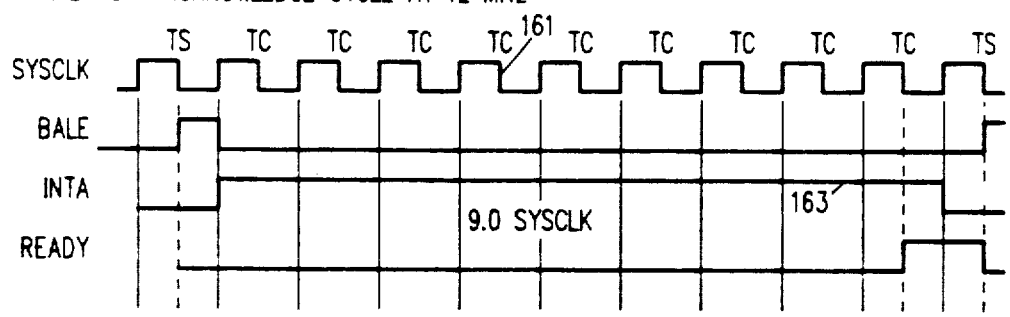
FIG. 9D

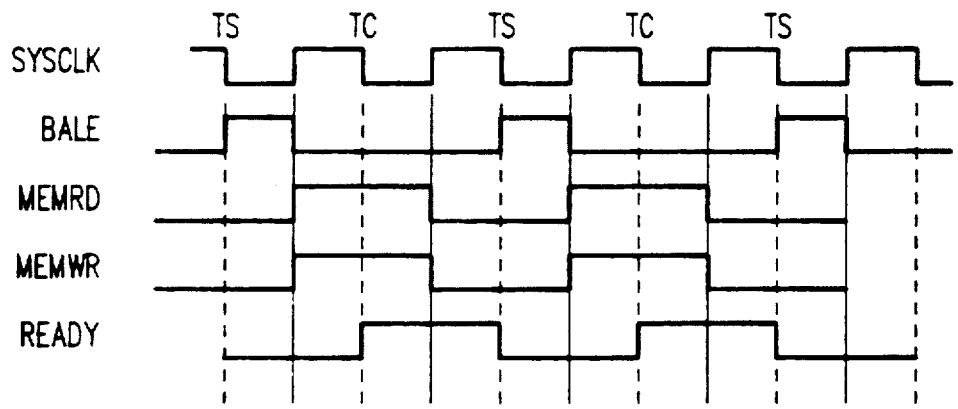
FIG. 9E
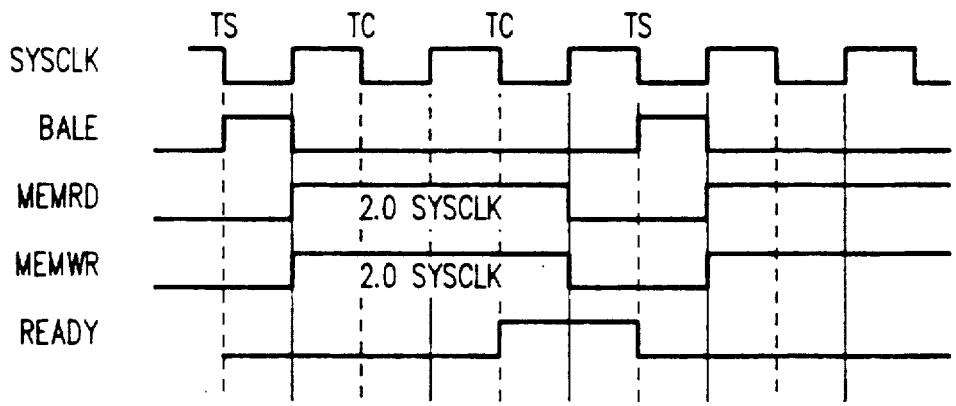
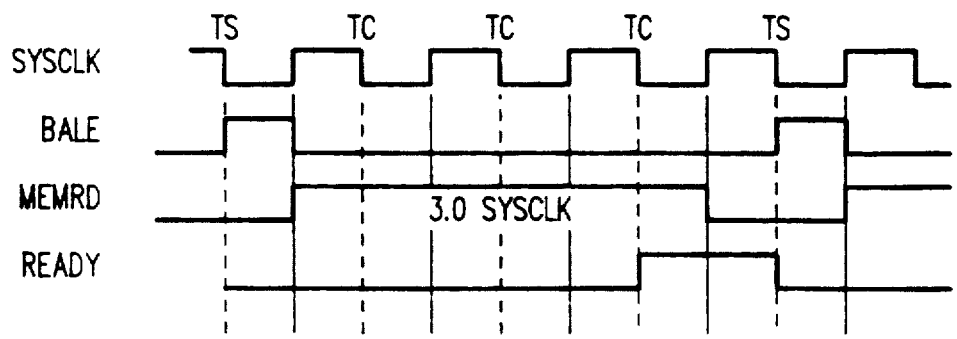
FIG. 9F

CONTROLLER WITH CLOCKING DEVICE CONTROLLING FIRST AND SECOND STATE MACHINE CONTROLLER WHICH GENERATE DIFFERENT CONTROL SIGNALS FOR DIFFERENT SET OF DEVICES

BACKGROUND AND SUMMARY OF THE INVENTION

The present invention relates to microcomputer systems, and in particular, system controllers therefor. Such system controllers provide control of data flow and address and data timing for microcomputers, which may include more than one microprocessor operating at different speeds with respect to themselves and to other elements of the system.

Microprocessor and memory technologies are advancing rapidly and are expected to continue to advance indefinitely. Moreover, microprocessor and memory technologies are advancing at different rates so that the difference in performance parameters of the microprocessor, the memory and the bus over which they typically communicate tends to expand or contract, i.e., become greater or lesser, as advances are perfected. Thus, performance characteristics of microcomputers employing emerging technologies also advance at different rates.

While present-day microcomputer manufacturers have control over the design and configuration of the systems they produce, they typically must anticipate the parameters necessary for compatibility of their system with add-on peripherals, accessories and memory options produced by other manufacturers. The performance characteristics of such peripherals, accessories and memory options will vary among the manufacturers of these devices. Since the systems for which they were designed also vary, the performance characteristics of such devices are often designed for less than optimum performance, i.e., "detuned". Therefore, the manufacturer of high performance microcomputers must allow for different, even inferior, performance characteristics of peripheral and accessory devices and memory options in order to produce a system which is compatible with the maximum number of devices attachable to the system. If the microcomputer manufacturer does not so anticipate such different performance characteristics, it will limit the marketability of the system to less than the total market available for his product.

A complete microcomputer, which is often intended for desktop applications, includes subsystems such as a central processing unit (hereafter referred to as the "CPU", "processor" or "microprocessor"), a math "coprocessor", dma capabilities, memory, miscellaneous system ports, and interfaces to video, keyboard, floppy disks, serial and parallel ports, scsi devices, and a mouse pointing device.

The microcomputer functions by manipulating address, data, and control signals among the subsystems within the system. The control of system data flow and address and data timing is provided by the system controller which controls the data flow and timing between the processor, main system memory, and the bus.

As faster microprocessor and memory devices became available to microcomputer system designers, increased performance was limited by other components of the systems. For example, the speed of asynchronous bus controller technology could not be expected to increase at a rate commensurate with increasing the speed of the processor and memory devices, even though the speed of the processors and the memory devices were approximately the same and increasing at approximately the same rate. Thus, in the recent past, bus technology was typically limited to a bus cycle of 375 nanoseconds, in a microcomputer such as the PC/AT, manufactured by the IBM Corporation.

If the bus controller were simply driven faster to take advantage of the faster processors and memory devices now available, certain peripheral and ancillary devices would begin to fail in different ways in different systems. The faster the bus controller is driven, the more devices would fail and start to fail. Failure modes include loss of data, address and control signals to a point where response signals, i.e. "handshakes", were not working. Therefore, a microcomputer which would accept faster processor and memory technologies, e.g. 10 or 12 MHz, and still incorporate bus technology operating at 8 MHz is extremely desirable in order to operate with slower peripheral and accessory devices and memory options.

While development of memory components such as Dynamic Random Access Memory ("DRAM") devices have closely followed processor technology, often the control logic for these devices does not. Such logic functions and technology was also a limitation on overall microcomputer system speed. For example, in order for the processor to access memory, access signals must be produced in response to bus controller strobe signals which, in turn, are produced in response to access request signals from the processor. Additive overhead associated with both the bus and memory controllers arising from buffering and gate delays is required to produce these signals. Thus, the need for system memory control to be dissociated from the conventional bus controller is clear, owing to the high degree of interaction with the processor and system memory.

In addition, the design of components for typical microcomputers are relatively old and require longer access times. If the bus controller speed is scaled upwards proportionately, i.e., increased in linear fashion, the relative timing of all of the signals become shorter, certain address setup times and the like cannot be accommodated, and such devices are simply unable to respond.

Finally, the speed of operation of microcomputer subsystems is governed by one or more clock or timing signals which may or may not be synchronized. In the past, such clock signals were usually derived from more than one source which was not synchronized. Thus, when synchronized operation of subsystems was required, tolerances in the timing of control, gating and handshake signals had to be relaxed enough to allow for imprecise cooperation of clock signal source. For microcomputers operating at 8 MHz, performance was acceptable and reasonably reliable.

As operating speed is increased, however, critical system timing parameters must be substantially more precise than can be reliably achieved with multi-source clock signals. Thus, for operation at 12 MHz and above, clock signals produced from one source are required to preclude clock and control signal skewing and provide reliable, high-speed operation.

Separate system memory control according to the present, invention, ancillary to but cooperating with, present state-of-the-art bus controllers, provides 12

MHz processor accessing of 80 nanosecond DRAM available from any number of manufacturers. With the system controller of the present invention, bus timing margins comparable to 8 MHz machines are maintained even when the processor runs at 12 MHz. Therefore, 12 MHz operation has become not only possible, but extremely desirable and cost effective.

In addition, with the present invention, the processor may operate at 12 MHz while the bus provides 375-500 nanosecond cycle times. Moreover, bus cycle times can be selectively varied, manually or under program control, in the present invention, thus providing additional flexibility not available in microcomputers having a conventional bus controller interface among system elements.

In a microcomputer employing the present invention, clock signal generation is derived from a single source. The output of a crystal oscillator is divided by various networks to provide synchronized timing signals for all subsystems of the microcomputer.

The system controller of the present invention includes a bus controller and system memory controller not unlike the bus controller described in copending application for U.S. Pat. entitled "State Machine Bus Controller", Ser. No. 154,641, now abandoned filed on Feb. 9, 1988. Even with the flexibilities described therein, the microprocessor and memory technologies are still rapidly advancing, and are expected to continue to advance beyond the capability of that and other previously known bus controllers. Employing the system controller of the present invention, microcomputer systems may incorporate interactive, synchronous and concurrent system memory and bus control, provide variable bus cycle control and include mapping of address range and processor memory access type to determine bus cycle length necessary for efficient high speed operation.

DESCRIPTION OF THE DRAWING

FIG. 3 is a top assembly of the system controller of the system control unit of FIGS. 1 and 2.

FIGS. 9D-9F are detailed timing diagrams of control strobes produced by the bus timing and control component of the system controller of FIG. 3 comparing operation at different system, processor and memory access speeds.

DESCRIPTION OF THE PREFERRED EMBODIMENT SYSTEM CONFIGURATION

Figure 1:
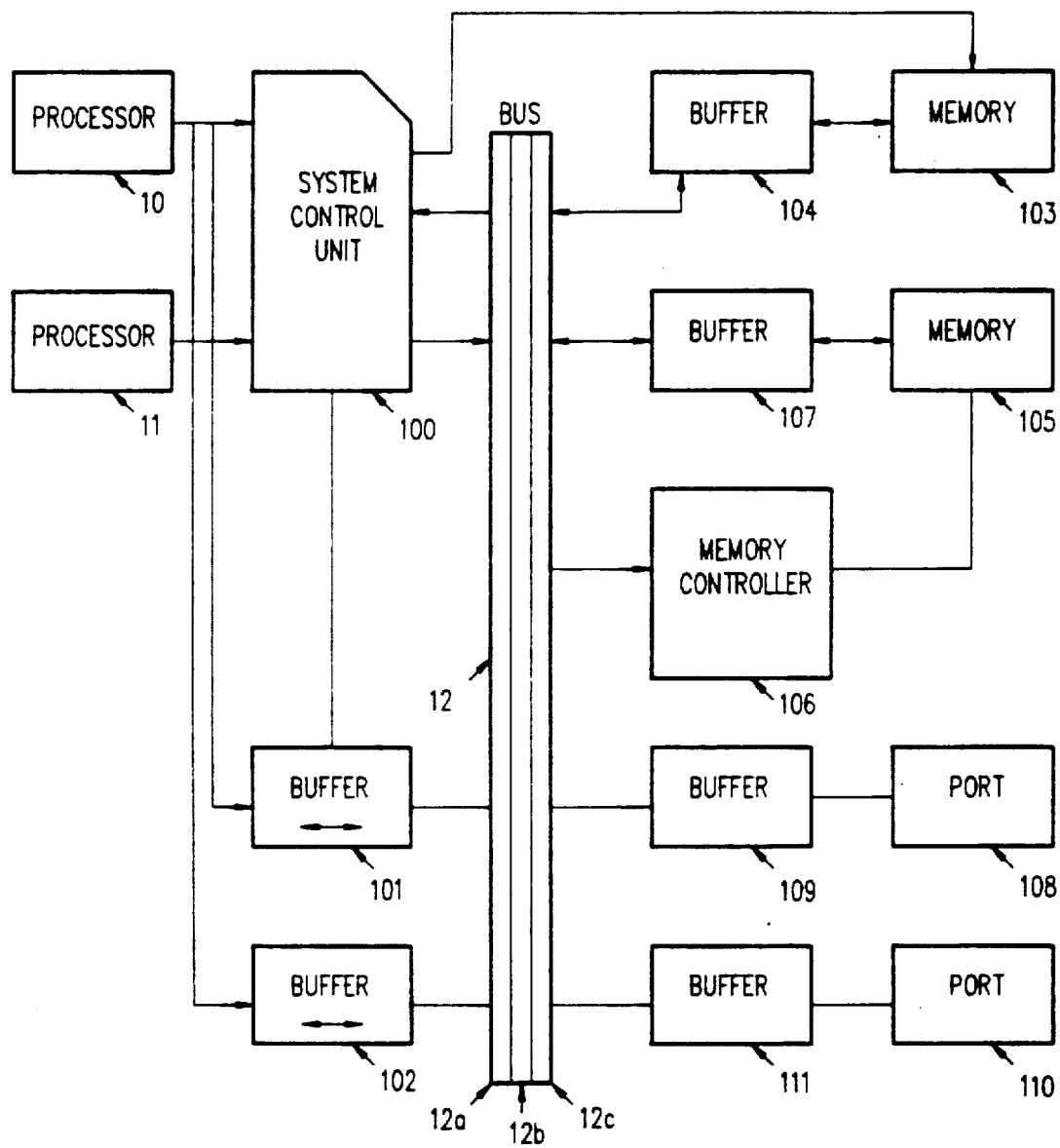
FIG. 1 is a block diagram of a microcomputer system employing a system control unit constructed according to the principles of the present invention.

Referring to Figure the microcomputer of the present invention incorporates processor 10 and co-processor 11. Processor 10 is a general purpose microprocessor with an extensive instruction set. Coprocessor 11 is a math coprocessor whose application is limited to math operations. These two microprocessors are connected to the same data bus and status lines. They interface with each other through a handshake over signal lines dedicated to this purpose.

Processor 10 can be a model 80286 microprocessor manufactured by Intel. As such, processor 10 comprises a 16-bit processor with an instruction set compatible with the family of processors known generally as the "8086 family" also manufactured by Intel. The typical operation of the processor is either an active cycle, or an inactive cycle. The active cycle is distinguished by status, (-S1 or -S0), and the status modifier, (MEM), signals along with the addressing and data information. The system control unit 100 converts this into a bus cycle. An inactive cycle is distinguished by the ACK (hold acknowledge) signal which indicates that the processor has suspended access while other types of accesses are in process. In this case no status is emitted, and no bus cycles are initiated by system control unit 100. The hold request sequence can be initiated by co-processor 11, a dma device, or the dynamic memory refresh control circuits, which are part of control unit 100.

Coprocessor 11, as employed by the present invention, is optional. When installed, the coprocessor, which works in parallel with processor 10, performs high speed arithmetic, logarithmic and trigonometric calculations. While the design of neither processor 10 nor coprocessor 11 is within the scope of this invention, detailed theory of operation for processor 10 and coprocessor 11, along with internal timing diagrams, can be found in the Intel Microsystem Components Handbook and appropriate iAPX286 Reference Manuals, and are incorporated by reference as if fully set further herein.

Since use of the coprocessor is optional in the present invention, a socket is provided for field installation of same. Pullup resistors (10k ohm) have been provided on -BUSY and -ERROR lines, and a 10k ohm pulldown resistor has been provided on coprocessor 11 PEREQ output line, to permit system operation without the coprocessor installed. The system configuration screen contains a toggle to indicate presence or absence of the coprocessor.

Referring again to FIG. 1, the microcomputer of the present invention also includes address, data and control signal bus 12 (hereafter bus 12); control unit 100; buffers 101 and 102; system memory 103 and related buffer 104; add-on system memory 105 and related controller 106 and buffer 107; local ports 108 and related buffer 109; additional ports 110 and related buffer 111. Bus 12, as shown in FIG. 1, represents three signals transmission functions, namely address bus 12a, data bus 12b and control bus 12c, required for overall microcomputer system control and operation, each of which are described elsewhere in this specification.

Buffers 101 and 102 comprise an octal latch, flip-flop and unidirectional and bidirectional buffers such as 74F373, 74F374, 74F244 and 74F245 microcircuits produced by several semiconductor manufacturers, including Texas Instruments. Buffers 101 and 102 provide signal conditioning and impedance matching for signals being transmitted on bus 12.

System memory 103 comprises both Read Only Memory (ROM) and DRAM such as AM27256-1DC, produced by AMD, and MT1259EI-12, produced by Micron Technology, Inc., respectively. The operation, particularly in cooperation with processor 10, is described more fully elsewhere in this specification. Buffer 104 comprises a 74F245.

Add-on memory 105 comprises components not unlike system memory 103, except that they are mounted on removable printed circuit boards which may be changed as desired. Buffer 107 is similar to buffer 104. Memory controller 106 may be a DRAM controller semiconductor circuit such as a TMS4500A for controlling access to add-on memory 105.

Local ports 108 and related buffer 109 comprise an 8254 counter-timer, an 8259 interrupt controller, an 8042 programmable microcontroller and a 146818 runtime clock and memory for providing interface with various system interrupt devices such as the keyboard. Similarly, additional ports 110 and buffer 111 are the same or similar microcircuits, which provide ports for transmitting control and data signals to such other subsystems as the video monitor, printers, floppy disk drives and telecommunications.

The design of buffers 101, 102, system memory 103, add-on memory 105, buffers 107, 109, 111, memory controller 106 and local and additional ports 108 and 110, respectively, are not within the scope of the present invention. They are shown and described here for illustrative purposes in providing a complete microcomputer system configuration.

Figure 2:
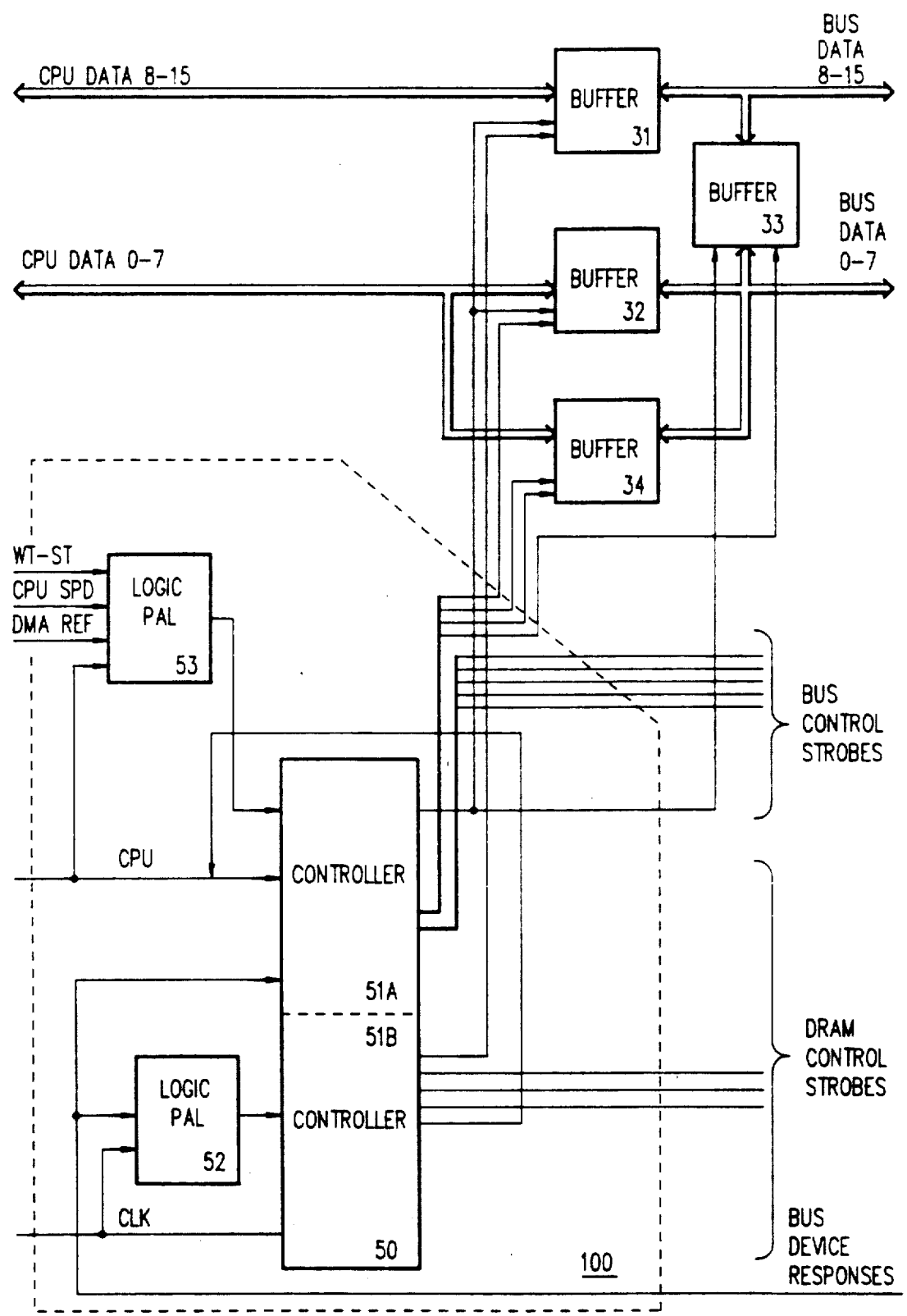
FIG. 2 is a block diagram of the system control unit employed by the microcomputer system of FIG. 1.

Referring now to FIG. 2, control unit 100 includes system controller 50, logic circuits 52 and 53. Buffers 31-34, shown external of control unit 100, are substantially the same structure and provide substantially the same function as the buffers of the same reference numbers described in the application for U.S. patent entitled, "State Machine Bus Controller", Ser. No. 154,641, filed Feb. 9, 1988, which is incorporated by referenced as if fully set forth herein.

Logic circuit 52 is a clocked programmable array logic (PAL) 20 microcircuit, part no. PAL16R6, manufactured by Monolithic Memories, Inc. for matching I/O channel timing to processor 10 timing requirements, and functions as part of the wait-state subsystem of state machine memory controller 51a of system controller 50 described elsewhere in this specification. In particular, logic circuit 52 combines information related to the type of access being executed with response signals from memory and peripheral devices coupled to bus 12 to produce output signals described by the equations given in Table I-A.

Logic circuit 53 is a PAL20L8, also produced by Monolithic Memories, which is not clocked, for providing wait-state and memory decode information to system controller 50. Functioning as the wait-state generator, logic circuit 53 decodes the type of process to be executed, CPU speed and DMA REFRESH signals, then sets the number of wait-states to be generated by state machine bus controller 51b. The output signals of logic circuit 53 are described by the equations given in Table I-B.

Control unit 100 provides the control, timing and clock signals for the microcomputer of the present invention. In particular, it provides control and timing between the processor 10, co-processor 11, the memory subsystem and system data bus 12b. It also provides clock signals for various peripheral functions (e.g. floppy disk controller, 8254 Clock/timer chip, serial port UART, etc.), and includes system controller 50.

Coprocessor functions provided by system control unit 100 are:

1) Decoding of chip select (-NPCS) for the coprocessor 11
2) Interrupt 13 (IRQ13) generation
3) Coprocessor reset (-RESET) control
4) Generation of busy (-CPUBUSY) signal for use by the processor 10.

The control functions provided by system controller 50 for purposes of the present invention include the following generalized functional areas:

1) Clock generation
2) System Memory Timing and Control
3) Reset Control
4) Bus Timing and Control
5) CPU Timing and Control Referring to FIG. 3, system controller 50 is an Application Specific Integrated Circuit (ASIC) based on state-of-the-art CMOS technology. Input and output signal and power signal designations, including connector pin numbers, are provided for controller 50 in FIG. 3.

Clock Generation

Figure 4A:
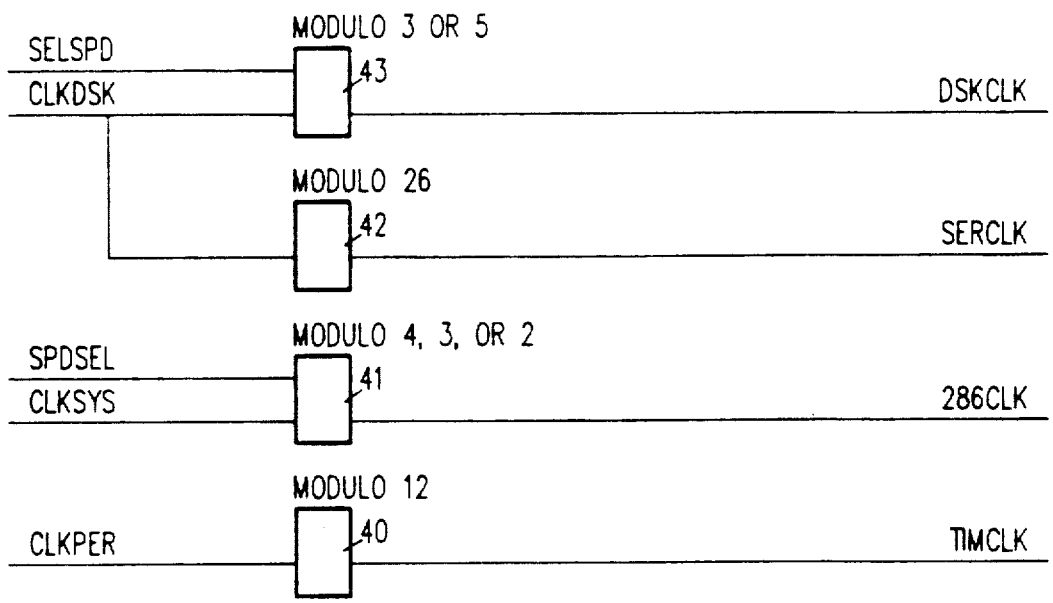
FIG. 4A is a block diagram of the clock signal generation component of the system controller of FIG. 3.

Referring to FIG. 4A, the clock generation section of controller 50 is utilized to provide clocks for use by processor 10 and related logic. The clock output signals generated and the input signals used to generate and control clock signals, together with ASIC pin arrangements, are shown in Table II.

Signal CLKPER is a 14.318 MHz oscillator input signal to system controller 50 used to generate the microcomputer system timer clock. Divider 40 divides the 14.318 MHz CLKPER input signal by 12 to create the 1.19 MHz clock signal TIMCLK, which is 20 utilized by the system timer. The 14.318 MHz CLKPER signal may also be provided to the I/O channel for use by some plug in I/O channel video adapters.

The CLKDSK input signal drives two circuits 42 and 43 within controller 50. Circuit 43, a modulo counter, divides by either 3 or 5 in the array. The result of this action is output signal DSKCLK. The SELSPD signal determines whether the circuit divides CLKDSK by 3 or 5. Modulo counter 43 is a synchronous loadable counter, so the SELSPD signal can change asynchronously at the clock edge.

The CLKDSK signal is a 48 MHz oscillator input signal. CLKDSK is divided by either 5 or 3 to create a 9.6 MHz or 16 MHz, respectively, clock output signal designated DSKCLK. This clock is provided to the floppy disk controller for use by the floppy disk subsystem. When SELSPD is high, DSKCLK is 16 MHz. When SELSPD is low, 9.6 MHz is presented on the DSKCLK pin.

Circuit 42 divided CLKDSK by 26, which results in the SERCLK signal. Since the CLKDSK input is 48 MHz, a 1.846 MHz signal on the SERCLK output pin for use in peripheral UART functions.

The CLKSYS signal is applied to circuit 41 which provides the output signal -286CLK. This signal is the result of dividing CLKSYS by 2, 3 or 4. Circuit 41 is also a synchronously loadable modulo counter. In the present invention, the CLKSYS input is driven by a 48 MHz oscillator, and is divided by 2, 3 or 4, depending on the state of the -KYBRST and -NPCS input and/or the SPDSEL input signals. When SPDSEL is high, divide by 4 operation is selected, if controller 50 has not been placed in high speed mode (i.e. divide-by-two operation).

Divide-by-two operation is selected by a crosscoupled latch (not shown) within controller 50. The gate or control for the latch is connected to the -KYBRST input pin. The data for the latch is connected to the -NPCS input pin. When the -KYBRST line is driven low, the -NPCS input is low and the SPDSEL input is high, and the modulo counter will count by 2. If the -NPCS signal is driven high before the -KYBRST signal is driven high, the latch will not be set in the divide-by-two condition. Thus, controller 50 speed is switched from high back to low or medium. High speed operation (i.e. divide-by-two) is terminated when the -RESET pin is driven active (i.e. low), whereas low speed operation is selected using the -KYBRST and -NPCS lines.

With the system oscillator, CLKSYS, running at 48 MHz, the clock frequencies provided at the -286CLK output pin are 24 MHz, 16 MHz and 12 MHz. A truth table for -286CLK operation when 10 using array input line -KYBRST to select between high (24 MHz) and low (16 or 12 MHz) speed operation is provided in Table III-A.

Once system controller 50 has been set to provide a 24 MHz (i.e. high speed operation) clock signal to the -286CLK pin, it will remain in that state regardless of the state of -NPCS input signal until the next -KYBRST pulse. If 16 or 12 MHz (i.e. low speed operation) has been selected, changing the state of the SPDSEL line will immediately change the -286CLK frequency without any change on the -KYBRST line. A truth table for selection of the low speed operating frequency (i.e. 16 or 12 MHz) is provided in Table III-B.

In the present invention, the purpose of the -286CLK logic is to provide the ability to switch between high speed CPU operation (24 MHz clock) and low speed operation (i.e. 16 or 12 MHz clock). The -286CLK signal is provided to pr3ocessor 10 to generate internal subsystem timing.

SYSCLK signal is generated by dividing the -CLK286 input by 2. SYSCLK is also synchronized with the -S1 signal processor 10, to insure that system timing is synchronous the internal clock of processor 10. The SYSCLK is generated from the -CLK286 input instead of the output -286CLK to permit optional use of an external oscillator for processor and system timing.

Figure 4B:
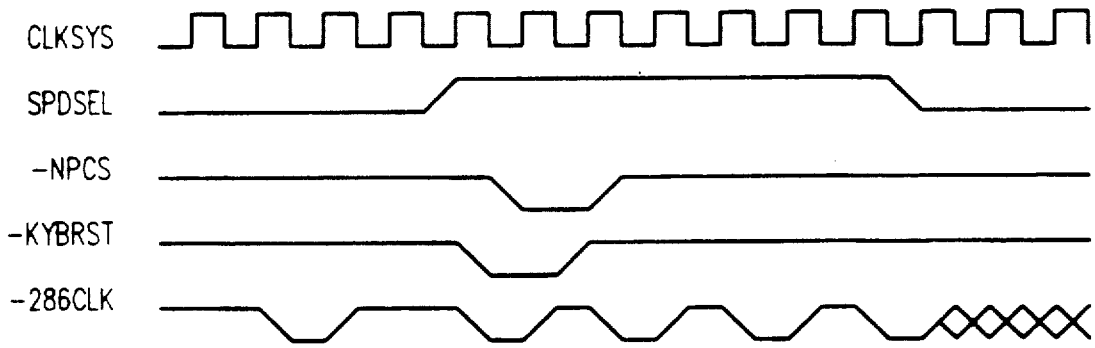
FIGS. 4B-4E are timing diagrams for the signals produced by the clock generation component of FIG. 4A.
Figure 4C:
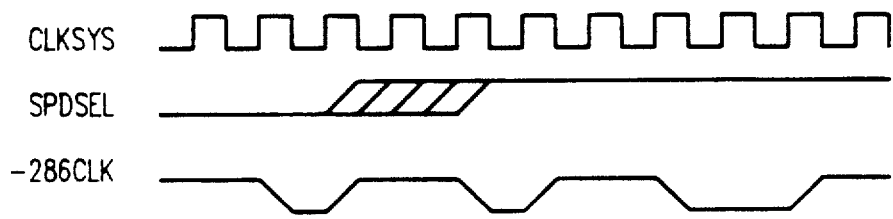
Figure 4D:
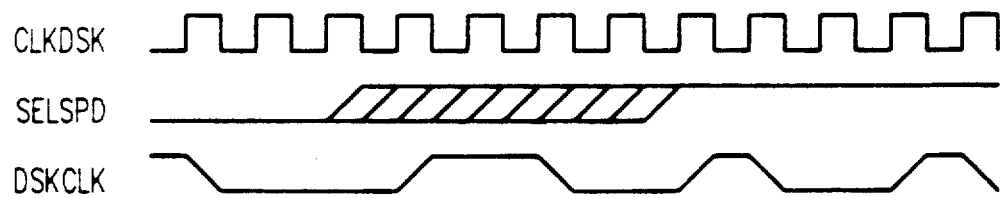
Figure 4E:
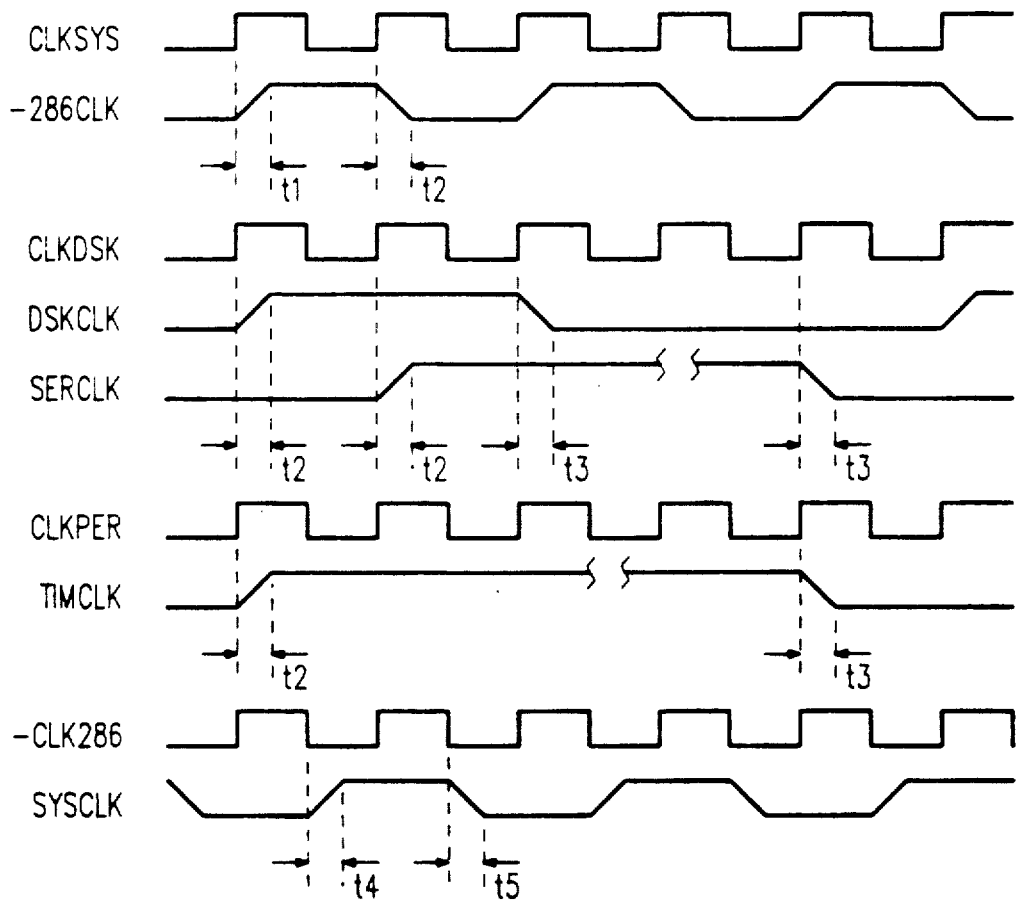

FIG. 4B shows timing of controller 50 to switch the clock (-286CLK) from 16 MHz to 24 MHz. FIG. 4C shows switch the system clock from 16 MHz to 12 MHz. FIG. 4D timing to switch the disk clock from 9.6 MHz to 16 MHz. FIG. 4E shows the propagation delays for the various clocks generated in system controller 10. The timing diagrams propagation delays for worst case voltage, temperature and processing. The numbers assume an 85PF capacitive load on all output pins.

Figure 4F:
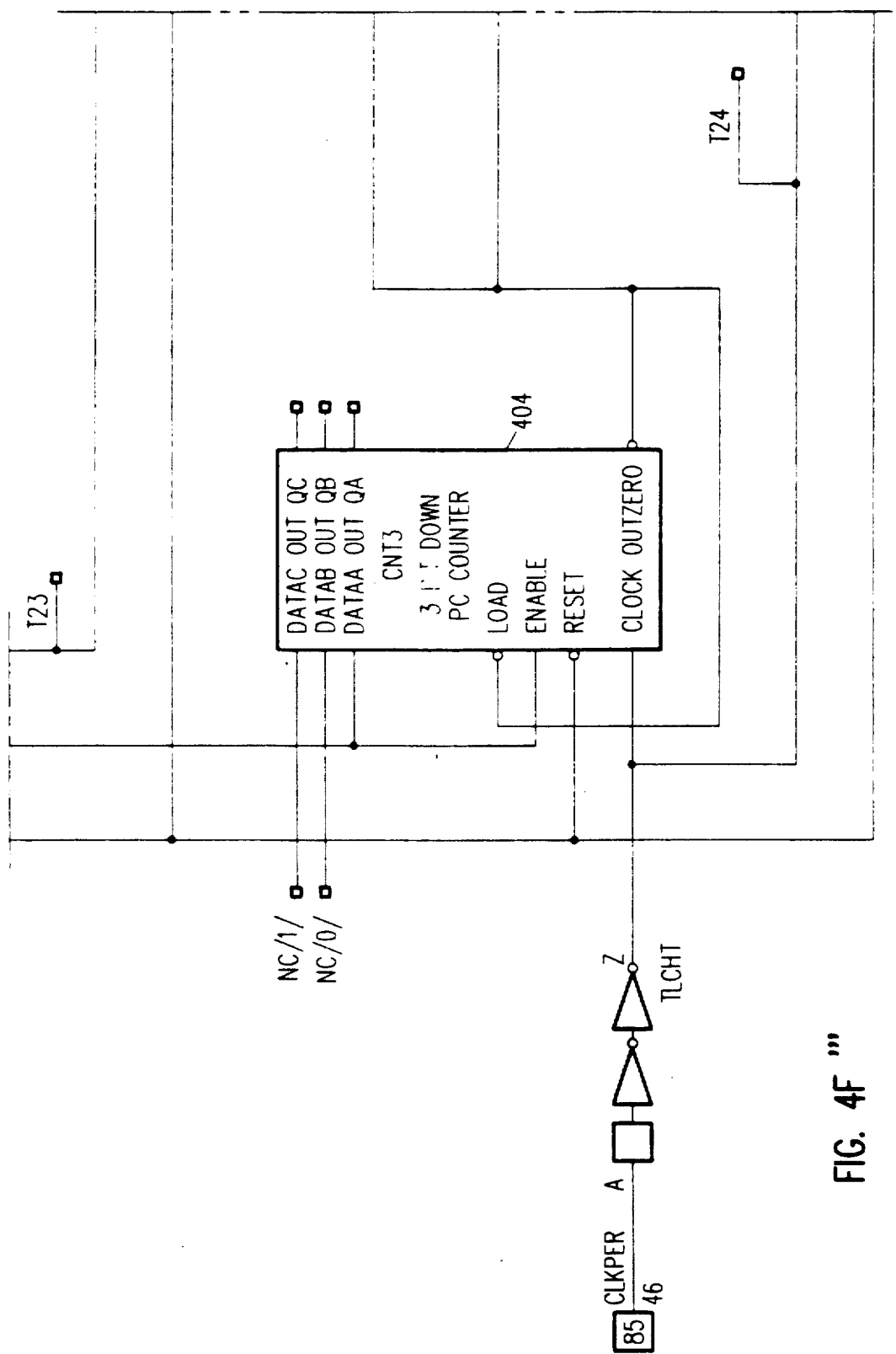
FIG. 4F is a circuit diagram of the component of FIG. 4A.

Referring to FIG. 4F, which is a more detailed circuit diagram for producing the clock signals of FIG. 4A, down counter 401 produces DSKCLK signal in response to input signals SELSPD, -CKLRST and CLKDSK. SERCLK signal is produced by 5-bit counter 402 in response to input signals CLKDSK and -CLKRST. Down counter 403 produces 286CLK signal in response to SPDSEL, -CLKRST and CLKSYS input signals. Down counter 404 produces TIMCLK signal in response to CLKPER and -CLKRST input signals. Down counters 401-404 are synchronized loadable down counters to and from which input and output signals, respectively, are coupled via suitable buffering logic as shown.

SYSTEM MEMORY TIMING AND CONTROL

Access to the system memory 103 can occur in three modes, namely, 1), an access by processor 10; 2) an access during a dma operation; and 3) an access during a dma/master mode operation. Data paths and timing vary according to the type of access requested. All timings which are given in this specification assume 12 MHz operation.

The close cooperation and coupling of system memory 103 with processor 10 enables the high performance, i.e. zero wait-state operation, of the entire microcomputer system. Data flow from processor 10 to the system memory 103 is via bus 12b. Therefore, there are two levels of buffering: 1) from the processor to the bus by buffer 102; and 2) from the bus to the memory by buffer 104.

Figure 5A:
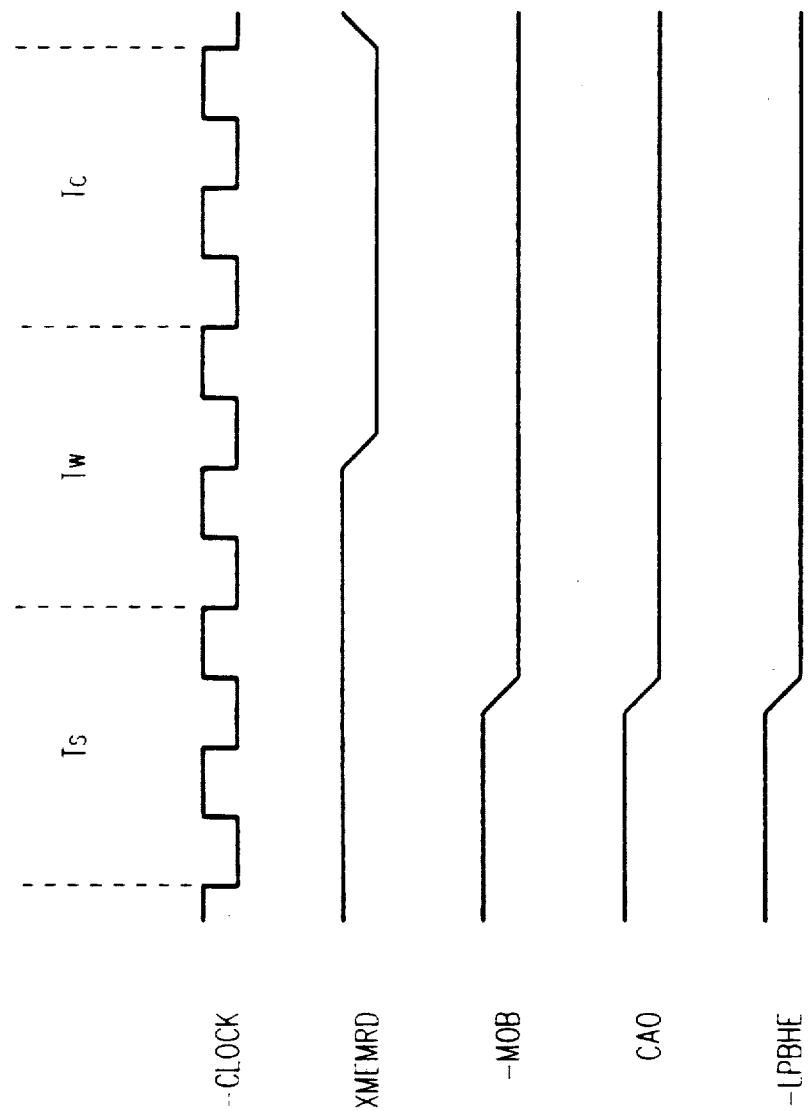
FIG. 5A is a diagram for control signals to and from the bus for the memory system and control components of the system controller of FIG. 3.

The control of buffer 102 is achieved by three signals; -ENL, -ENH and DT. The control of buffer 104 is provided by four signals; -MEMRD, CA0, -CBHE and -MOB. FIG. 5A shows the data flow timing to and from the bus 12b.

The control signals for buffers 102 and 104 are provided by system controller 50 or are derivatives of signals which were produced by the system controller. Since the signals generated by system controller 50 are derived indirectly from the main clock, the timing reference for these buffer control signals will be referenced to signal -CLOCK.

State machine memory controller section 51b of system controller 50 determines whether the memory access in process is an access to system memory 103 or to add-on memory 105 from information received from logic circuit 53. System controller 50 then activates the proper Row Address Strobe (RAS) and Column Address Strobe (CAS) lines at the proper time to achieve access to DRAM.

The addresses which access the individual memory cells in the DRAM semiconductor circuits of system memory 103 are generally referred to as RAS and CAS addresses because RAS and CAS signals strobe the appropriate cell addresses, (hence RAS [row address strobe]and CAS [column address strobe]). CAS addresses are derived from the channel addresses. RAS addresses are not. The RAS pulse is generated at a time when channel addresses are changing. RAS addresses are obtained from processor address lines which are stable at that time.

Logic circuit 53 generates wait-state information (WS1, WS2, WS4, WS8), as well as system memory signals (-UMOB), lower 1 Mbyte (-ULMEM), and memory decode (MM0 and MM1). From these signals, along with the status from the processor 10, (-S0, -S1, MEM, ADDR0, -BHE), system controller 50 can determine the type of memory operation to be performed. An access to ROM does not require RAS or CAS signals.

The control signals for the processor-to-buffer transmission are enabled early in an access cycle to provide proper set up time for the data during a write operation. The RAS and CAS signals from the system controller require external buffering due to typically heavy capacitive loading of DRAM.

Figure 5B:
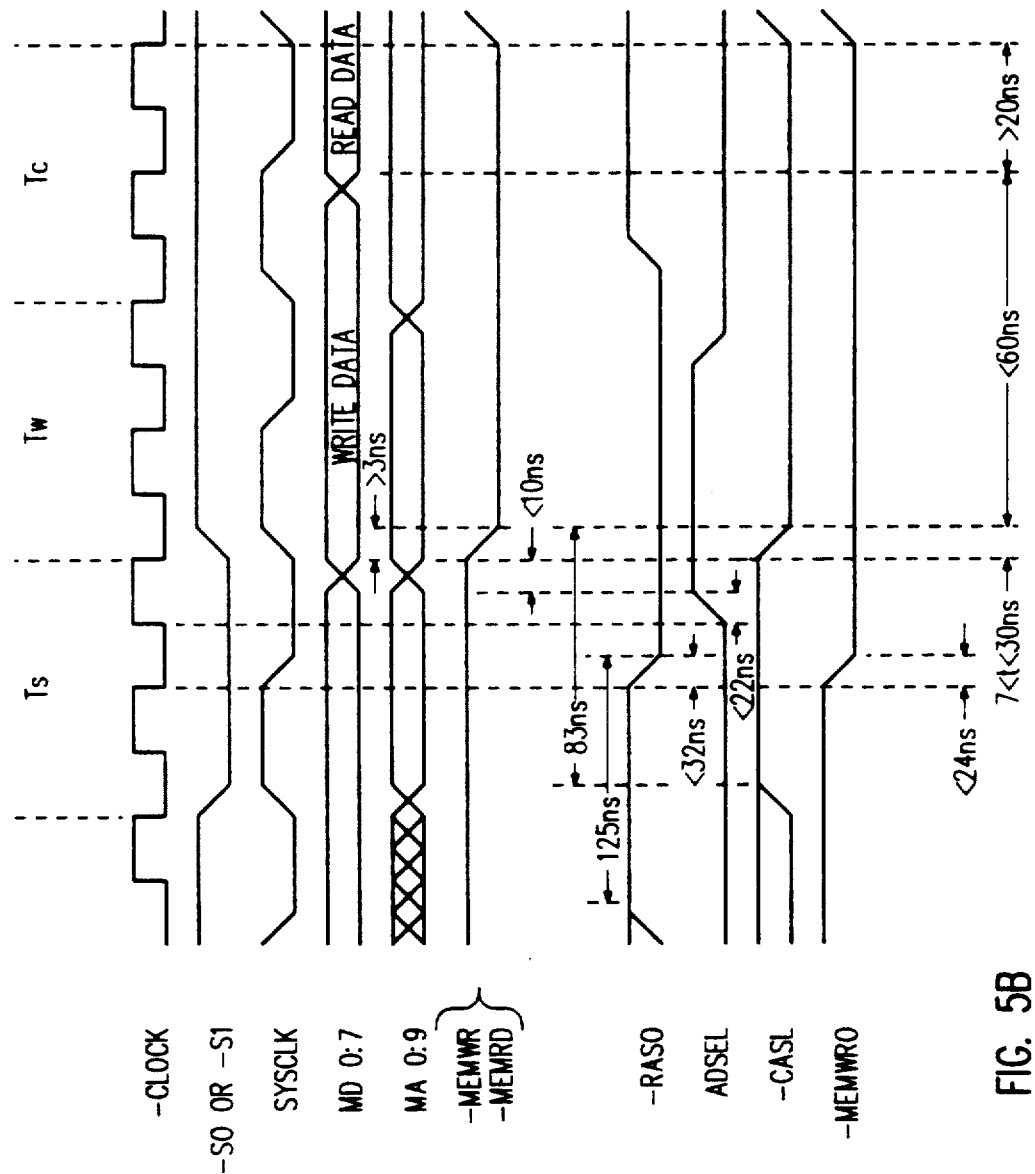
FIG. 5B is a timing diagram for signals produced by the system memory timing and control component of the system controller of FIG. 3.

Referring to FIG. 5B, as soon as system controller 50 detects an access to system memory 103, it generates the proper buffer enable and RAS signals when a clock pulse occurs in the middle of status cycle (TS). The CAS cycle, (if it is a RAM access), is generated when a clock pulse occurs at the end of TS. Thus, the entire command cycle is used for CAS access to DRAM.

The RAS signal becomes inactive on the next clock (i.e., middle of command cycle [TC]). In order to meet the RAS pulse width requirement of components for 12 MHz/1 wait-state operation, latches to extend the RAS signals by 1 clock cycle are included in system controller 50. This design results in the RAS lasting from the middle of TS to the end of TW.

Typical DRAM components available to designers at this time require the addresses be multiplexed. The control signal which multiplexes the memory addresses is ADSEL. This signal changes state between the RAS and CAS pulses.

Table IV indicates the speed requirements and performance characteristics for different combinations of clock speeds and wait states.

Referring to Table IV, the first number in the "SPEED/WS" column refers to the speed of processor 10, the second number is the number of wait-states to system memory 103. The "CYCLE" column refers to the total cycle time of processor 10 which elapses during one access to system memory 103, and "ACCESS" refers to the RAS access time to DRAM available. The "MEMORY" column is the speed required of system memory 103 components to work properly in the system. The "MEM CYCLE" column is the cycle time of a memory component (this number must be equal or less than the number in the cycle column, i.e., total processor cycle time).

Figure 5C:
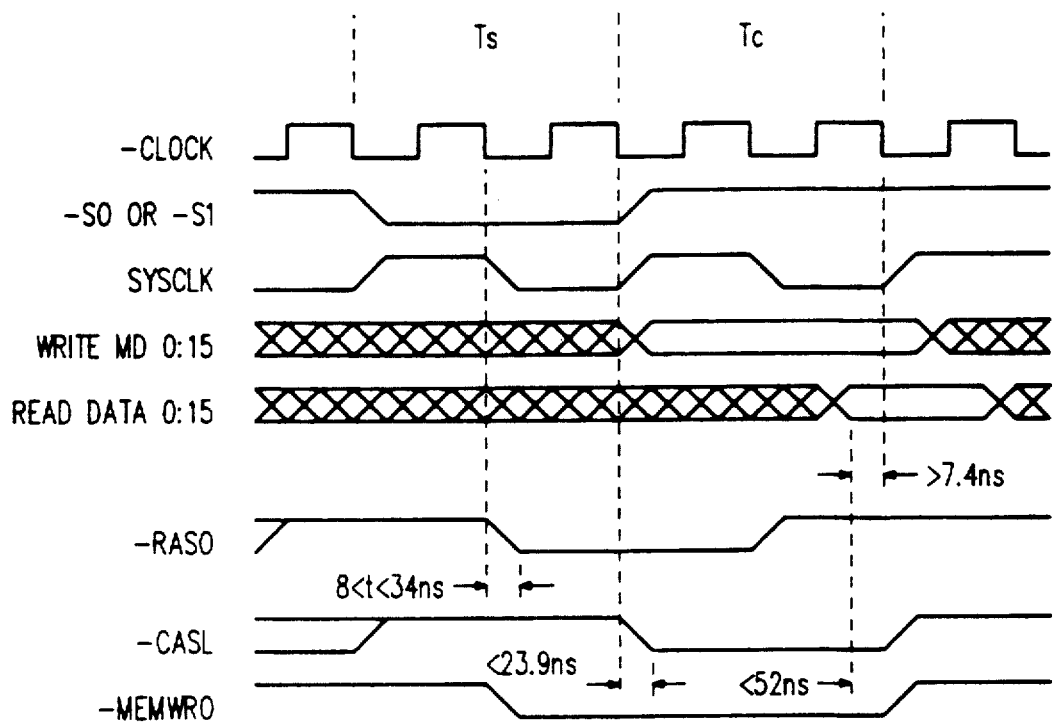
FIG. 5C is a timing diagram for ZERO wait-state operation of the system memory of the microcomputer system of FIG. 1.

Usually memory components having faster cycles times are more expensive. However, since the elimination of a wait-state can be an important performance enhancement, the extra cost of the faster memory components may be worthwhile. The timing for ZERO wait-state operation during access to system memory 103 is given in FIG. 5C. Operation of the DMA access to memory and access to memory during a dma/master modes are essentially the same. The system controller samples the -MEMRD and -MEMWR signals while ACK signal is active and generates the appropriate -RAS and -CAS signals. Since the DMA circuits drive address and data buses 12a and 12b, respectively, the control of the memory data buffers 102 and 104 is still accomplished with -MEMRE, -MOB, CA0 AND -CBHE signals. The signal -CBHE is derived from LPA0 during an 8 bit DMA operation. The -MOB signal is derived from the upper addresses, and the latch which stores -MOB is transparent during hold acknowledgement cycles, as is the case during DMA operations.

During an access to system memory 103 in both a dma/master mode operation and a conventional dma operation, bus 12b is driven by the master device for controlling buffers 31-34 and -MEMRD and -MEMWR are sampled by system controller 50 to generate the appropriate RAS and CAS signals.

In the present invention, parity is checked on every read access to DRAM. Likewise, parity is generated and written on every write access to DRAM. Parity is latched on the trailing edge of -MEMRD. Detection of a parity error in system memory will result in a nonmaskable interrupt (NMI) to processor 10. The system requires that all DRAM in system memory 103 be loaded by the power up initialization software routine before it is read to avoid parity errors on initialization. The same system design and hence the same timings are used for both the upper and lower data byte.

Figure 6B:
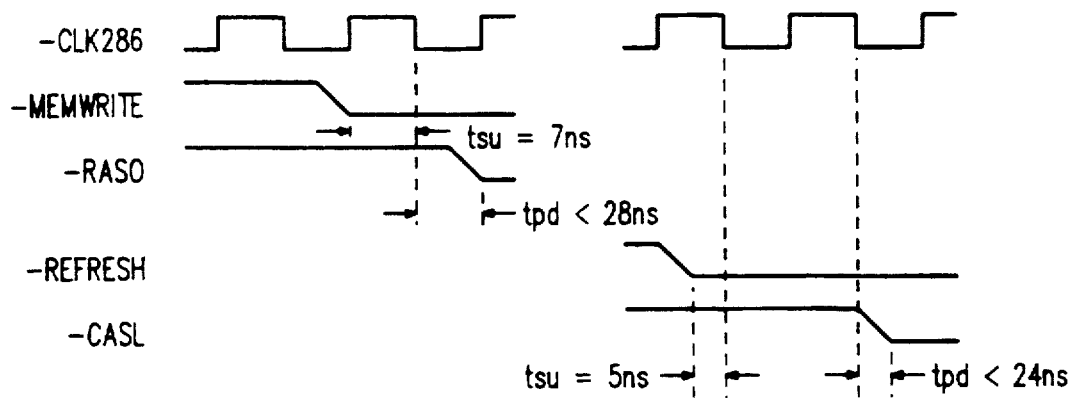
FIGS. 6B-6E are timing diagrams for signals produced by the system memory timing and control component of FIG. 6A.
Figure 6A:
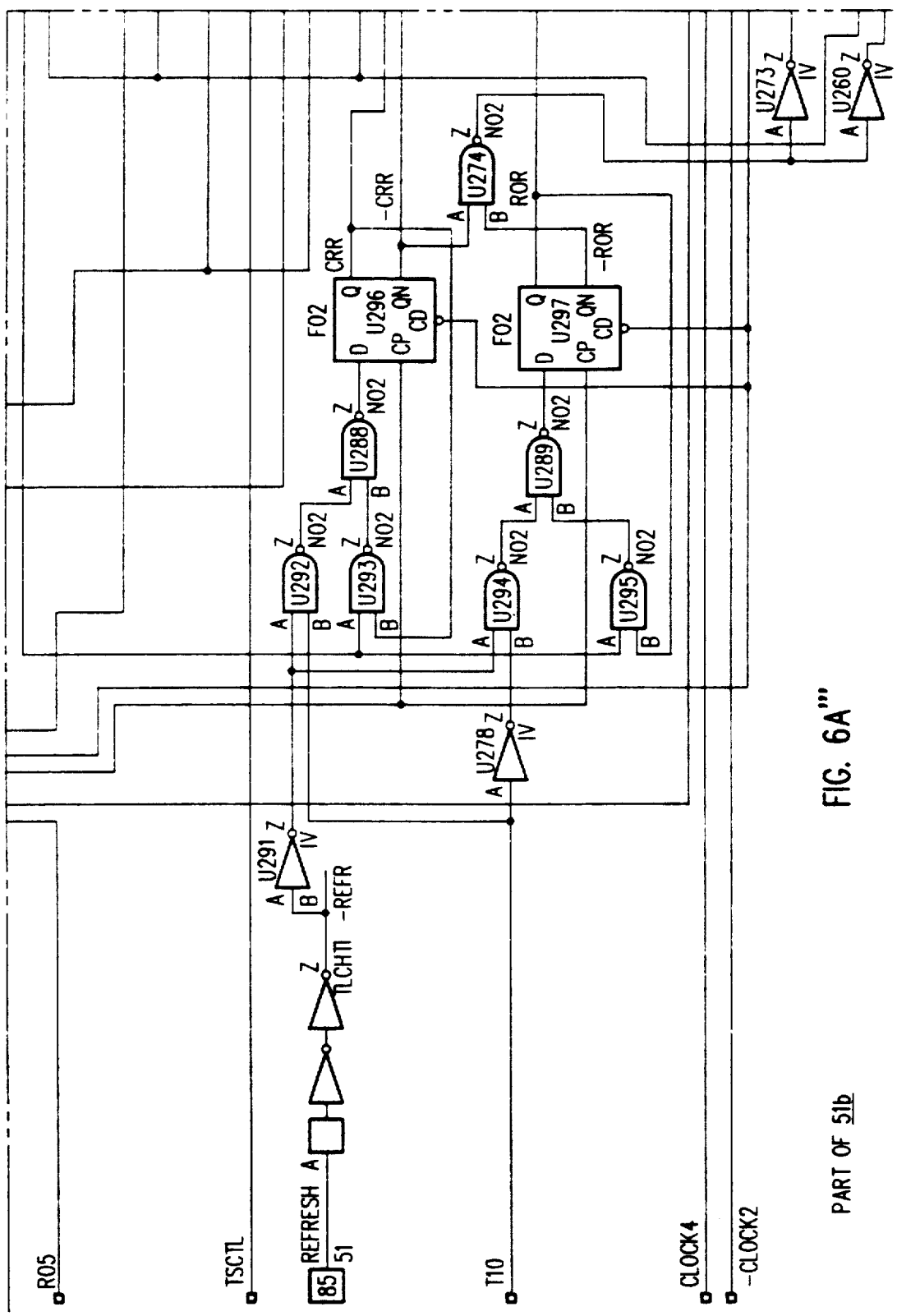
FIG. 6A. is a circuit diagram for the portions of system memory timing and control and the bus timing and control components of the system, .controller of FIG. 3.

Referring now to FIG. 6A, the system memory timing and control section of controller 50 generates the RAS, CAS and MAS signals which are utilized to control operation of the system memory 103. The signals associated with DRAM timing, and related ASIC pin numbers, are listed in Table V-A.

The DRAM control logic functions in three modes: normal (or CPU) mode, external mode and refresh mode. In normal mode, the CPU is accessing RAM to perform a read or write operation. In external mode, the bus control logic in controller 50 responds to signals from the system DMA controller or I/O channel bus master to permit access to memory by these devices. In refresh mode, logic in system controller 50 generates CAS, RAS and other system control signals required to refresh the DRAM components comprising system memory 103.

Processor 10 initiates a normal mode operation by asserting -S0 or -S1, and providing MEM, -BHE, A0 and a memory address. Address decode logic in control unit 100, external of controller 50, generates LMEM, MM1 and MM0 signals, which inform controller 50 that a DRAM operation is being performed in memory under control of controller 50. System controller 50 then generates the appropriate RAS signal to select the desired memory bank. The particular RAS signal activated depends on the MM0 and MM1 input signals applied to controller 50. The relationship between the MM0, MM1, LMEM, -RAS0, -RAS1 and -RAS2 is indicated in Table V-B.

An external mode operation occurs when -MEMREAD or -MEMWRITE input signals become active (i.e. low) while -ACK is active (i.e. low). The three RAS and two CAS signals are controlled by controller 50 on the basis of MM0, MM1, LMEM, -AEN1, -BHE and CA0 in a manner similar to normal (or CPU) mode operation (see Table V-B).

RAS and CAS logic in controller 50 uses two cycles of -CLK286 to generate the appropriate -RAS pulse. Thus, if -CLK286 is 12 MHz, the -RAS pulse width will be 166.666 nsec, and the RAS pulse width is 125 nsec when -CLK286 frequency is 16 MHz. The CAS signal is generated one -CLK286 cycle after -RAS, except for refresh mode operations. Thus, Table V-B also provides the relationship between -RAS. -CAS. MM0. MM1. -S0. -S1. CA0. -BHE. -MEMREAD and -MEM-WRITE for normal (CPU) and external mode operations.

Referring now to FIG. 6B, which shows set-up times for external DRAM access and refresh cycles, a refresh operation is executed by the array when the input -REFRESH goes low. Refresh logic in controller 50 supports both RAS and CAS-before-RAS refresh operations. CAS-before-RAS operation is executed if the MEM input signal is high when the -REFRESH is low. If the MEM input is low when a refresh operation is being requested, (i.e. -REFRESH is low), a RAS only refresh operation is executed. The array will continue to generate the appropriate refresh timing as long as -REFRESH input is active (i.e. low). FIG. 6C indicates the RAS and CAS timing generated by controller 50 during a CAS-before-RAS refresh operation.

Figure 6D:
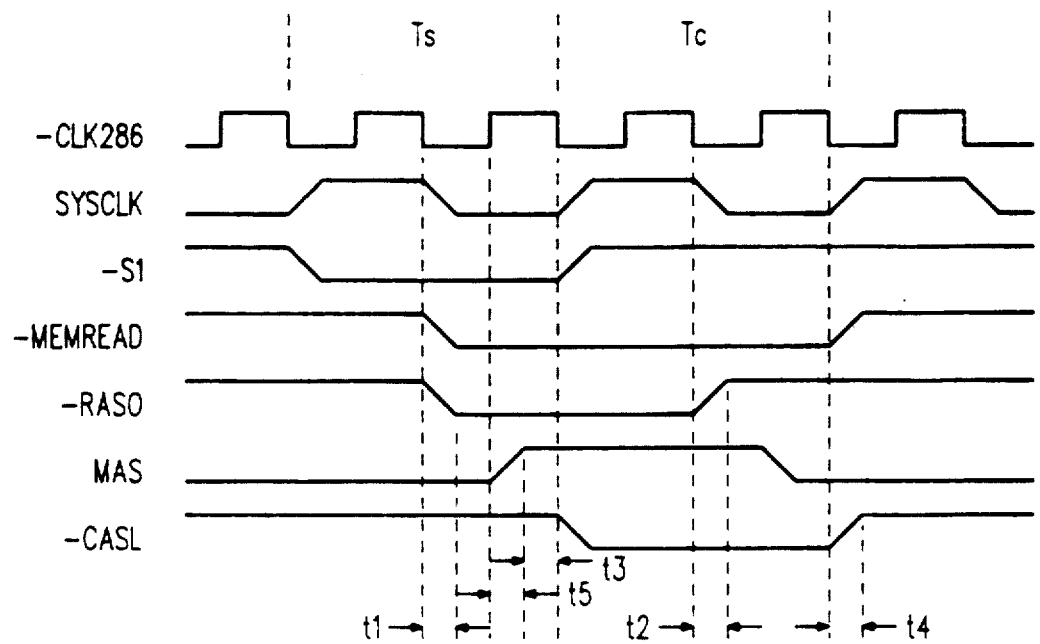

FIG. 6D shows the timing of signals provided by controller 50 for a memory read operation. The timing is essentially identical for both read and write operations, with the -MEMREAD or -MEMWRITE signals controlling selection of a read or write operation. Even though the timing chart shows only -MEMREAD, the timing and relationship is the same for a memory write cycle.

Table V-C provides timing information for the signals of FIG. 6D. Minimum and maximum limits provide system tolerance for accepting variations in DRAM performance characteristics arising from production differences among manufacturers, processes and raw materials.

Figure 6E:
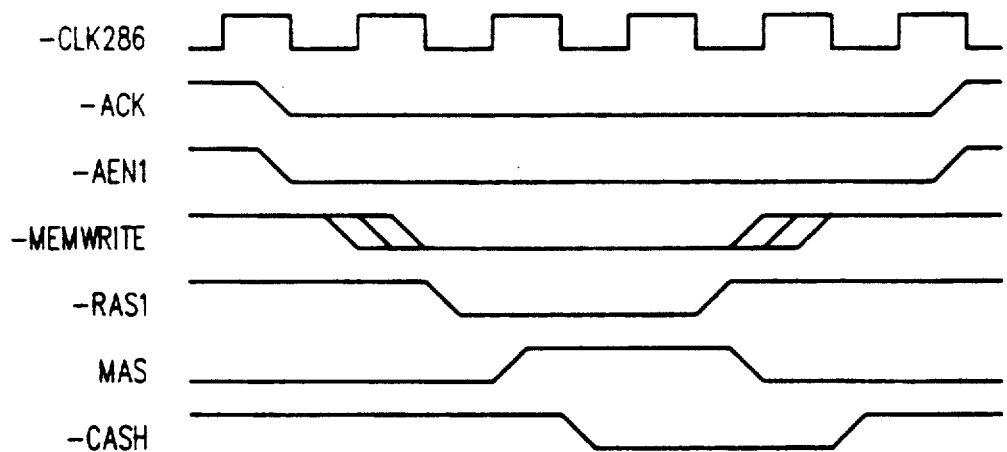
Figure 6C:
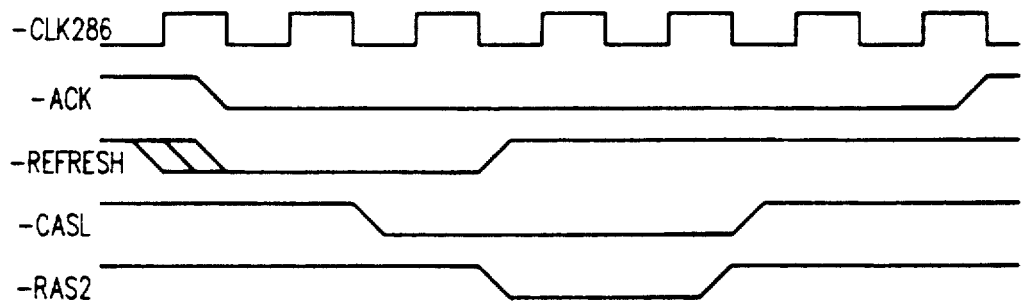

FIG. 6E shows the memory control strobes produced during an "external" operation, such as DMA. Even though only a memory write access is shown, the same strobes apply for a memory read access in external mode.

Reset Control

The reset control section of logic in controller 50 controls the reset timing for the microcomputer system in general and processor 10 in particular. The signals associated with generation of the reset timing and control are given in Table VI.

Two reset output signals are provided by controller 50, namely, RST286, which would normally be utilized to reset processor 10; and -SYSRST, which is provided to rest the microcomputer system logic. Output -SYSRST is active (i.e. low) when array input -RESET is low and the next high-to-low transition of -CLK286 occurs.

The RST286 signal is active (i.e. high) for three separate sets of conditions as follows:

1) If -SYSRST occurs, controller 50 also generate RST286. For this case, RST286 is active coincident with -SYSRST, and remains active for twenty-four CLK286 cycles after -SYSRST becomes active.

2) RST286 also is active coincident with the leading edge of -KYBRST, and remains active for twenty-four -CLK286 cycles after -KYBRST becomes inactive.

3) If -S0 and -S1 are active (i.e. low), A1 is high and MEM is low: controller 50 causes RST286 to be active. RST286 remains active for twenty-four CLK286 cycles. Bus Timing and Control Logic for microcomputer bus control and time generation is included in system controller 50. Signals associated with the I/O bus control logic, with related ASIC pin numbers, in controller 50 are shown in Table VII-A.

System controller 50 provides bus control and timing through use of -MEMREAD, -MEMWRITE, -IOREAD and -IOWRITE output signals. -MEMREAD and -MEMWRITE signals indicate that processor 10 is executing a memory access operation. The signals -IOREAD and -IOWRITE indicate that Input/Output operations are taking place to I/O devices instead of system memory devices. Input signals -MMCS16 and -IOCS16 determine whether a Byte (8 bits) or Word (16 bits) device is accessed. Based on these signals, controller 50 performs control of data bus buffers. Output signal -INTACK is an interrupt acknowledge, which functions in a manner similar to the -IOREAD signal.

When combined with appropriate external bus logic, system controller 50 can accommodate both byte and word memory and I/O operations. When a 16 bit device is accessed, the -MMCS16 or -IOCS16 lines are asserted (i.e. driven low) by the accessed device. -IOCS16 corresponds to an I/O read or write operation, and -MMCS16 corresponds to read or write operations in system memory 103. If an 8 bit device is being accessed (i.e. no -MMCS16 or -IOCS16 signal is activated), but processor 10 has ordered a 16 bit operation, the array executes a special double byte operation.

When controller 50 senses that a double byte operation is to take place, it executes two one-byte transfers instead of a single 16 bit transfer. Between the first and second transfer, the CA0 output pin goes from low to high, thereby selecting the next higher byte location for transfer. Controller 50 indicates that a double byte operation is in process by setting the -FIRST signal active (i.e. low).

Processor 10 sends commands to controller 50 via the signals -S0, -S1, A0, A1, -BHE and MEM. For a detailed information of these signals, see the Intel Microsystem Component Handbook. Basically, -S1 indicates a read operation, -S0 indicates a write operation, and, when both -S0 and -S1 are active with MEM inactive, an interrupt acknowledge operation is executed. If both -S0 and -S1 are inactive while MEM is active, a CPU halt (A1 high) or shutdown (A1 low) is being executed by processor 10.

When a read or write operation is taking place, MEM is active (i.e. high) for a memory access and inactive (i.e. low) for an I/O access. The signal -BHE indicates a word access is taking place when A0 is inactive (i.e. low), or a byte operation when A0 is active (i.e. high). Table VII-B indicates the relationship between these signals and the operation being requested by processor 10.

The data interface between processor 10 and system data bus 12b is controlled by array outputs -ENL, -ENH, -ENX and -ENR. These outputs, when combined in the appropriate bus logic external of controller 50, configure system bus 12 for word, double byte, hi-byte or lo-byte operations. During a hold acknowledge operation, byte enable logic in controller 50 works in identical fashion, except that processor 10 does not generate -BHE. Therefore, controller 50 synthesizes -BHE by inverting CA0 during an 8 bit DMA operation since controller 50 requires this signal to perform this operation. This synthesized -BHE signal is used by the bus enable logic of controller 50 to generate the bus enable signals required to perform an 8 bit DMA transfer. Tables VII-C, D and E depict the relationship between the enable signals (-ENL, -ENH, -ENX and -ENR) and the type of operation being performed (i.e. read/write, word, hi-byte or lo-byte).

Figure 7A:
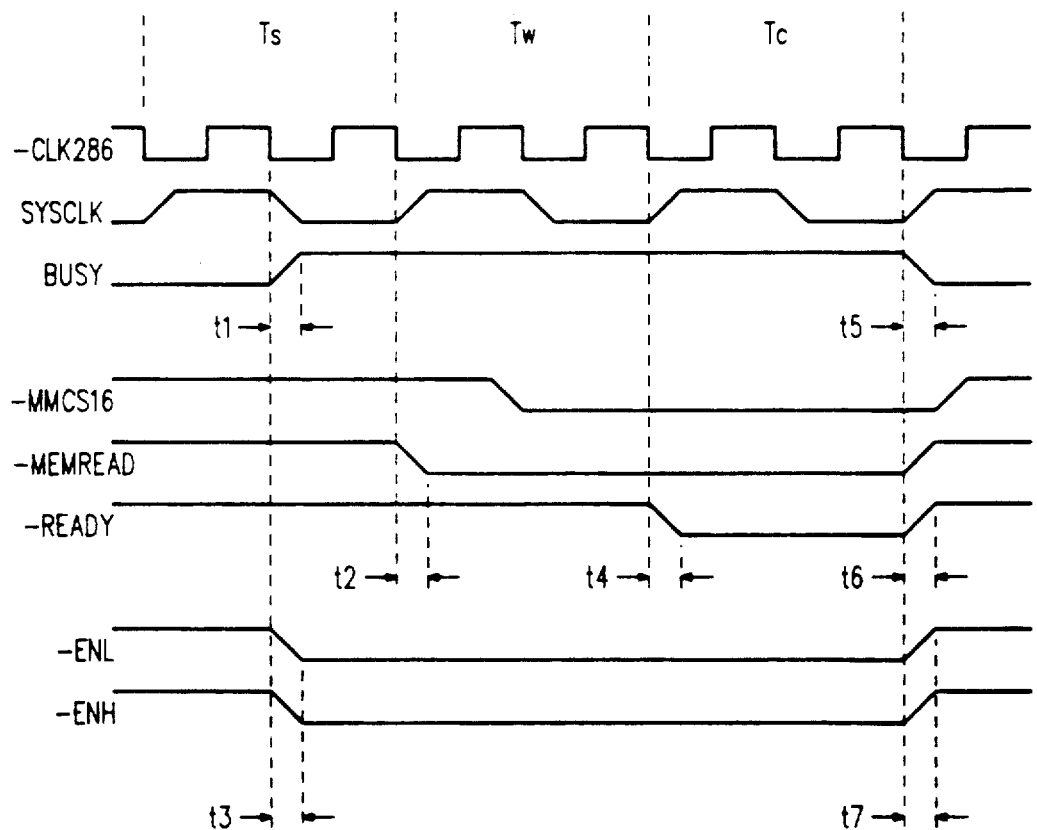
FIGS. 7A-7D are timing diagrams for control strobes produced by the bus timing and control component of the system controller of FIG. 3.
Figure 7B:
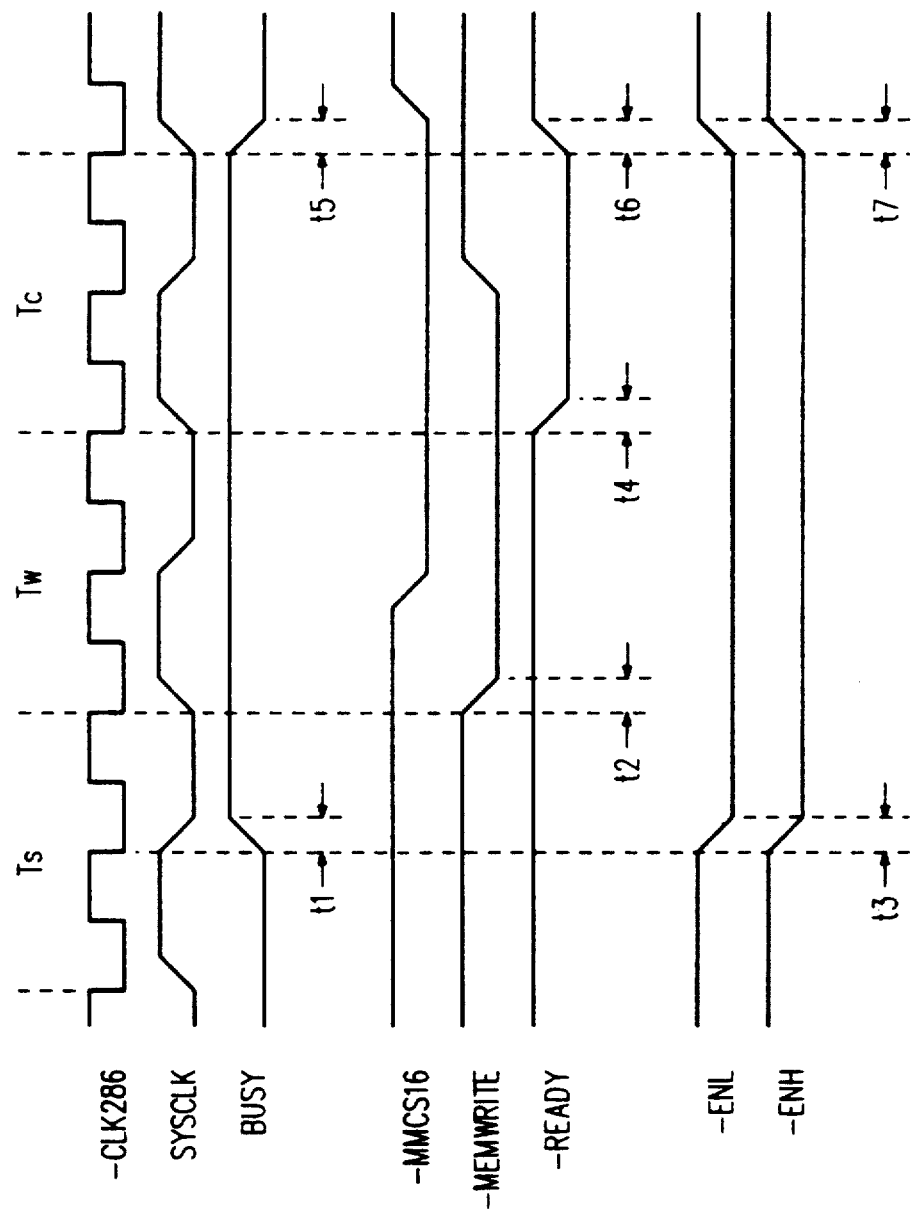
Figure 7C:
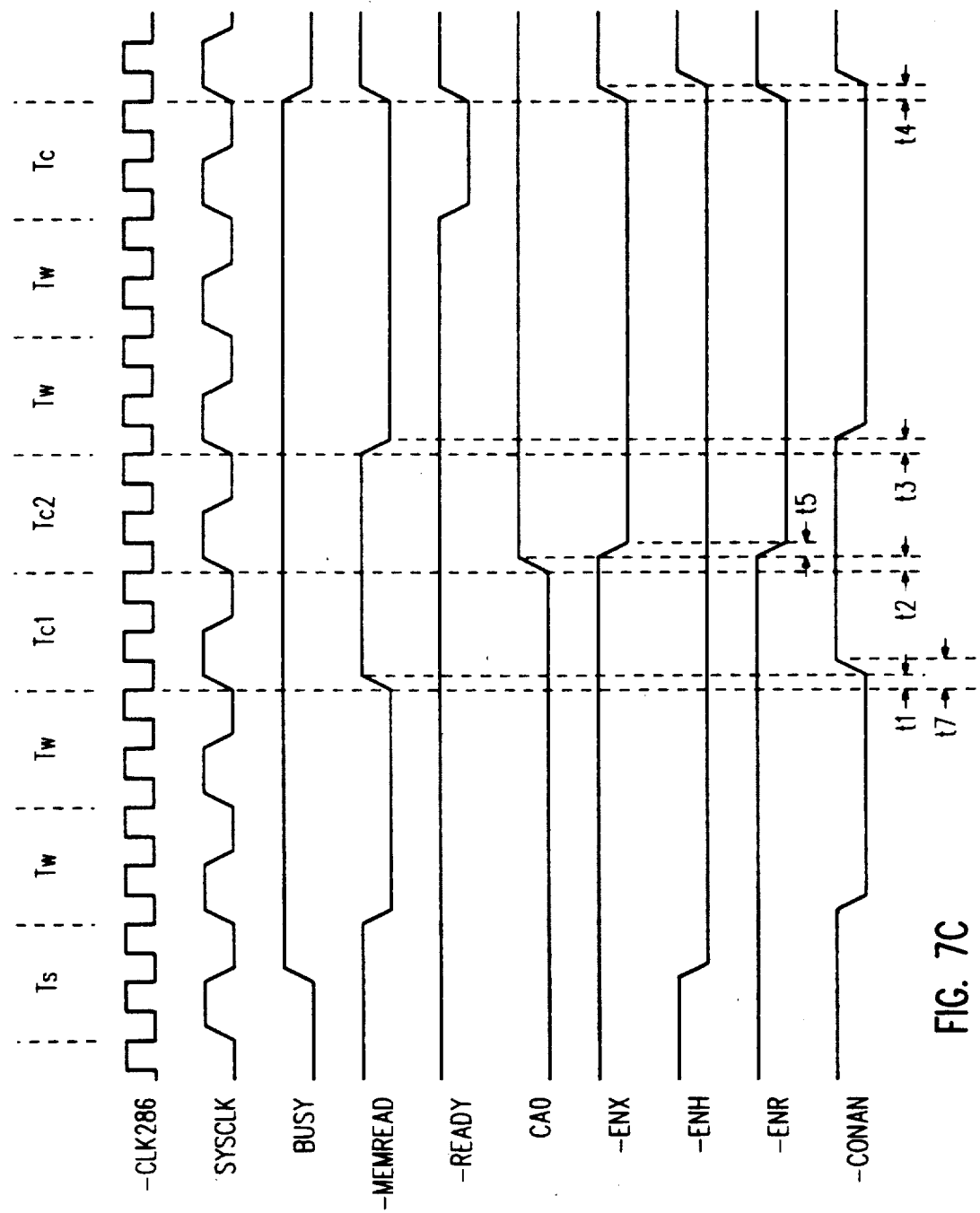

The timing for the bus control strobes produced by controller 50 is given in FIGS. 7A and 7B. The timing diagrams and propagation delays are indicated for memory strobes, but the corresponding I/O control strobes will have the same timing and propagation delays. Data bus control timing for double byte memory read and write operations is also shown in FIG. 7A. Minimum and maximum times for the bus control signals shown in both FIGS. 7A and 7B are indicated in Table VII-F. 5 timing for a memory word (i.e. 16-bit) operation, both The timing for a memory word (i.e. 16-bit) operation, both read and write, is depicted in FIG. 7C and 7D, respectively. Minimum and maximum times for bus control signals are given in Table VII-G.

Figure 7E:
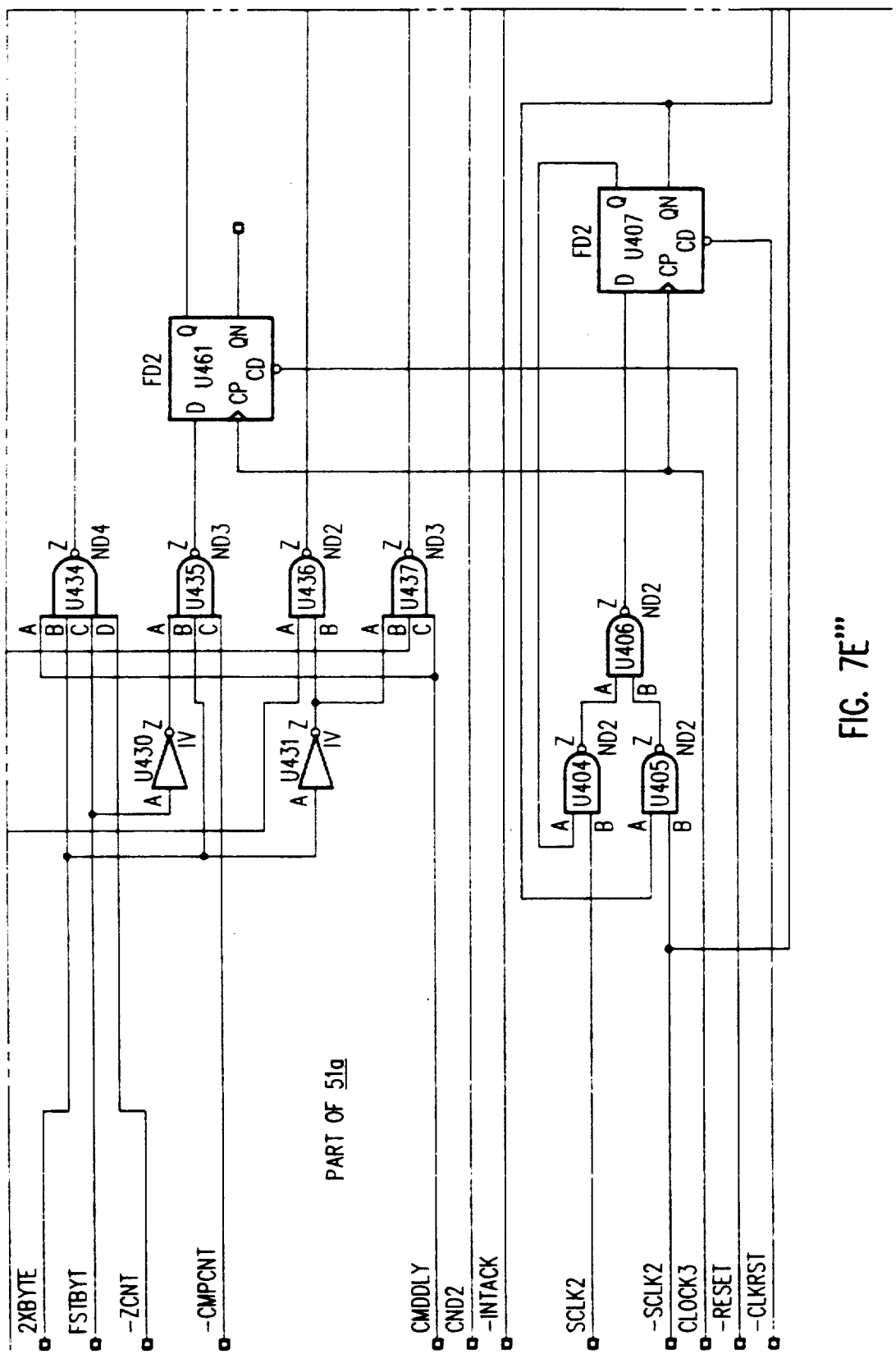
FIG. 7E is a circuit diagram for portions of the bus timing and control and system memory timing and control components of the system controller of FIG. 3.
Figure 7D:
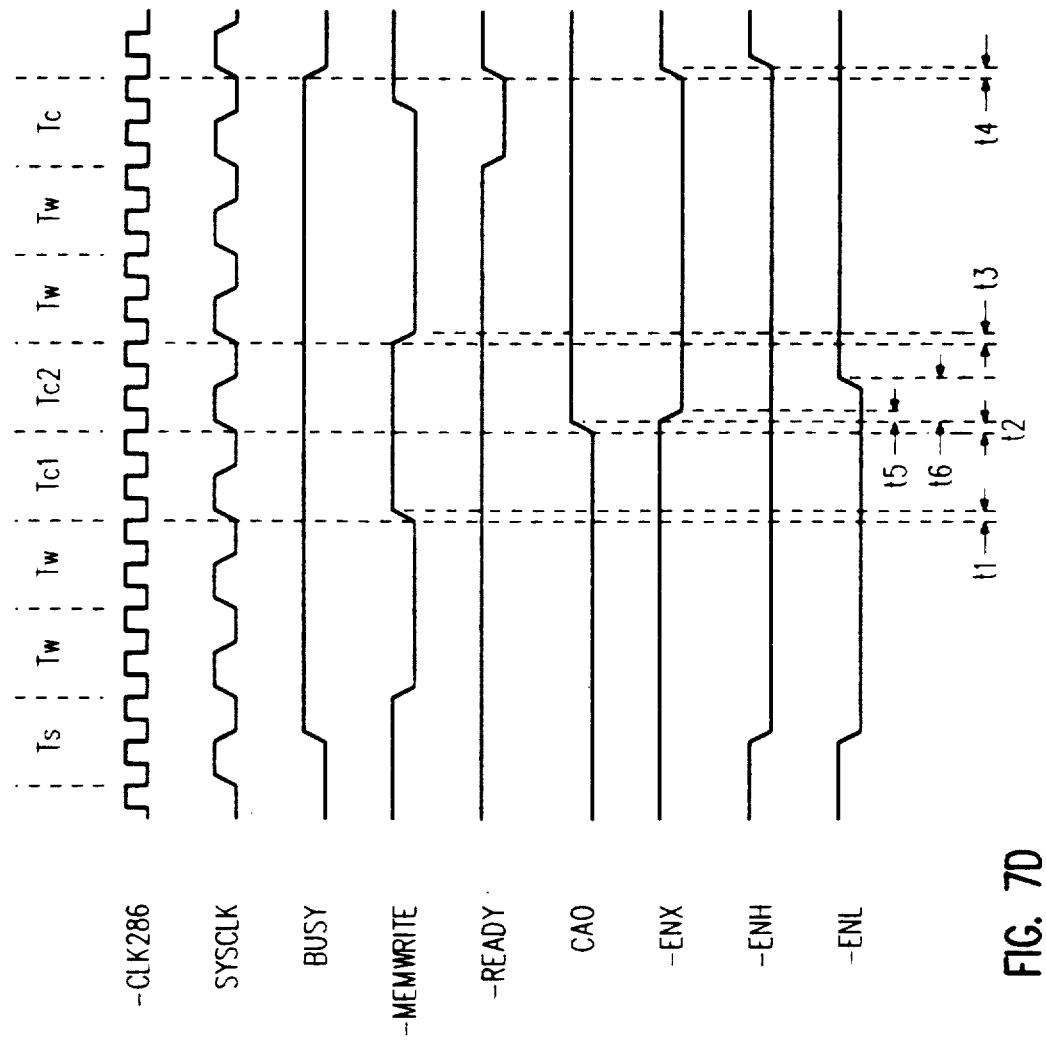

In FIG. 7E, a more detailed circuit diagram for producing the bus control strobes of FIGS. 7A-7D is provided. In that circuit, a common bus strobe is generated with timing which correlates the type of access and the device being accessed. The strobe is then logically combined with a signal representing the bus access type to produce bus strobes MEMREAD, IO READ, IO WRITE and INTA.

CPU Timing and Control

Signals associated with timing and control of processor 10 are produced in controller 50 and are listed in Table VIII-A. CPU timing and control logic in controller 50 is utilized primarily to generate the CPU Ready timing and the external address register latch 201 enable signals.

Figure 8A:
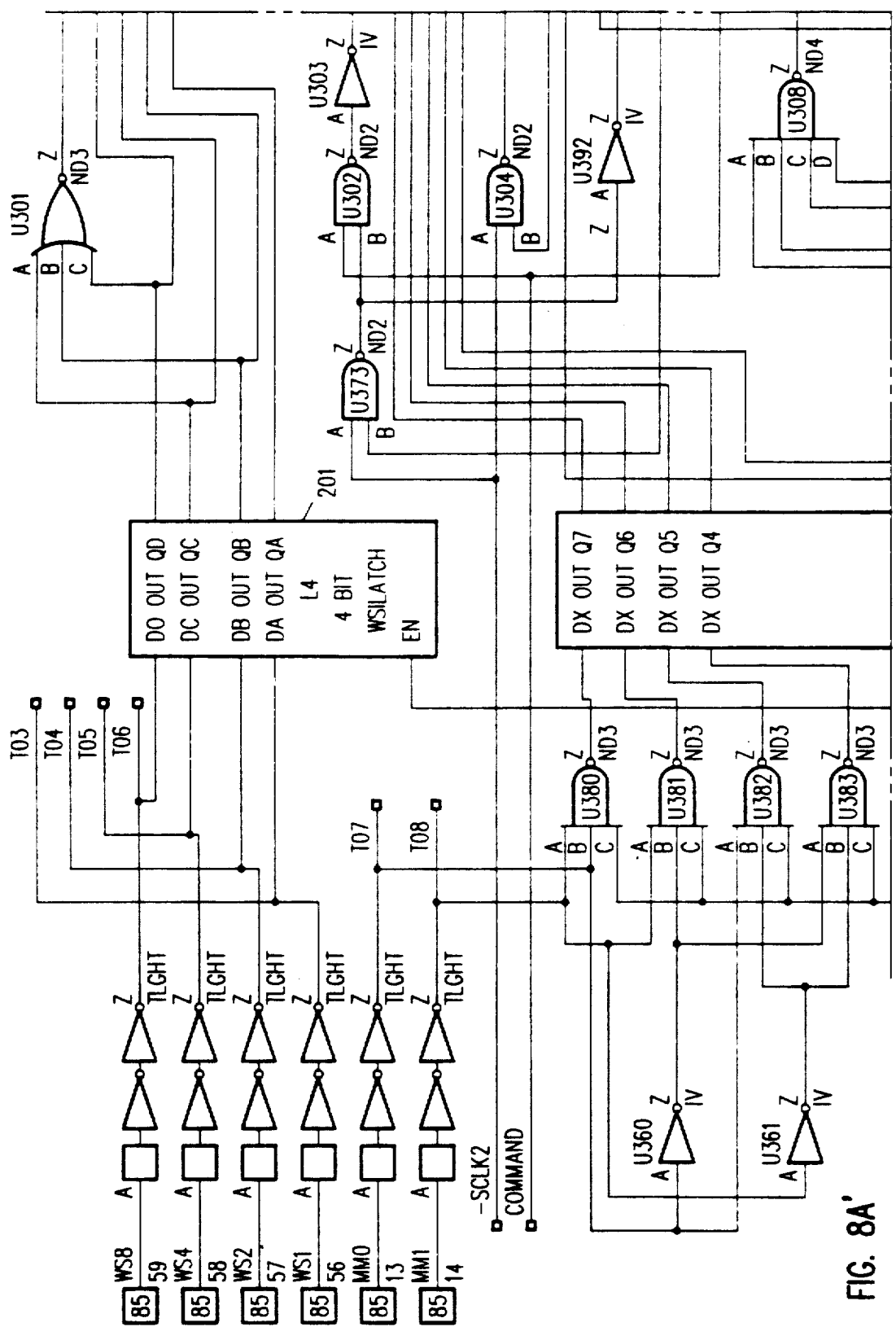
FIG. 8A is a circuit diagram for producing signals related to the wait state counter component of the system controller of FIG. 3.
Figure 8A:
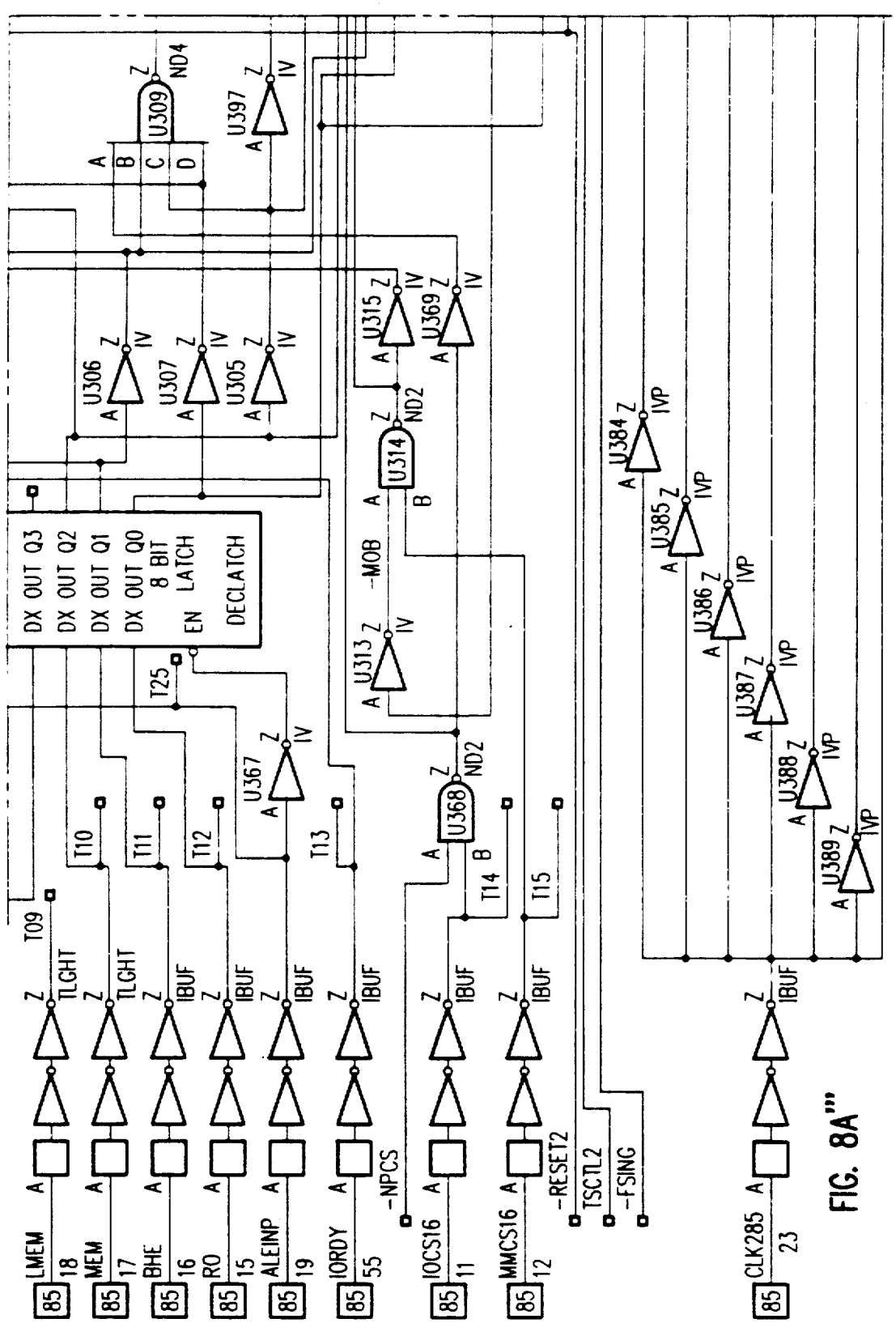

Referring to FIG. 8A, the WS1 through WS8 input signals to controller 50 are utilized to determine the number of wait states which must be inserted into each basic command cycle initiated by processor 10 to support memory or I/O access. Wait state counter 200, the logic used to insert wait states, is an implementation of a Gray code counter. For further information on Gray Code counters, see for example "Data Compression Techniques and Applications", Thomas J. Lynch, Wadsworth, Inc. 1985.

Table VIII-B indicates the number of wait states added to the CPU cycle as determined by WS1 through WS8 input signals. The timing of output signal -READY is determined by the number of wait states inserted by controller 50. Table VIII-C indicates the relationship between DRAM access time, CPU speed and the number of wait states selected by WS1, WS2, WS4 and WS8 input lines.

Figure 8B:
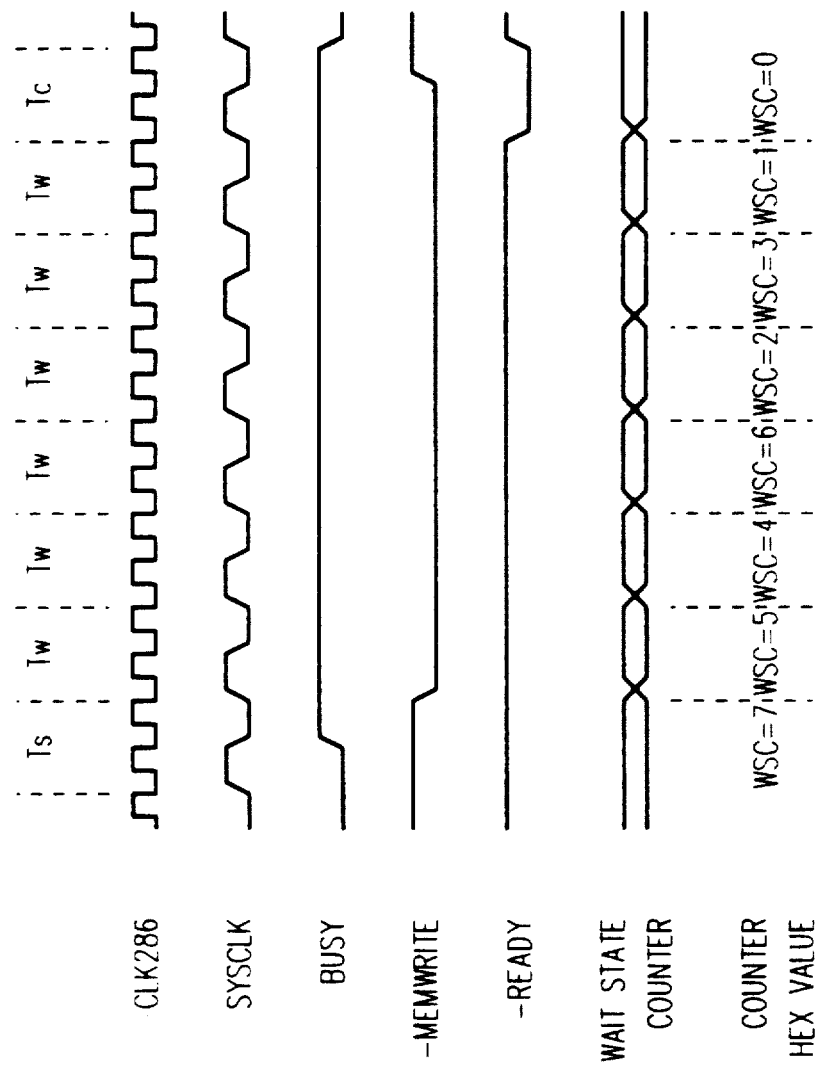
FIG. 8B is a timing diagram for the signals produced by and related to the wait state counter component of FIG. 8A.

FIG. 8B shows the operation of wait state counter 200 within controller 50 during a typical access. Wait state counter 200 is loaded in the first half of the status cycle (Ts). In this example, it is loaded with the hex value of 7. The wait state information provided to input pins WS1 thru WS8 of controller 50 is latched at the start of a CPU cycle by input signal ALEINP. The command cycle is terminated by the input signal -RDYINP.

BUS STRUCTURE AND OPERATION

Figure 9A:
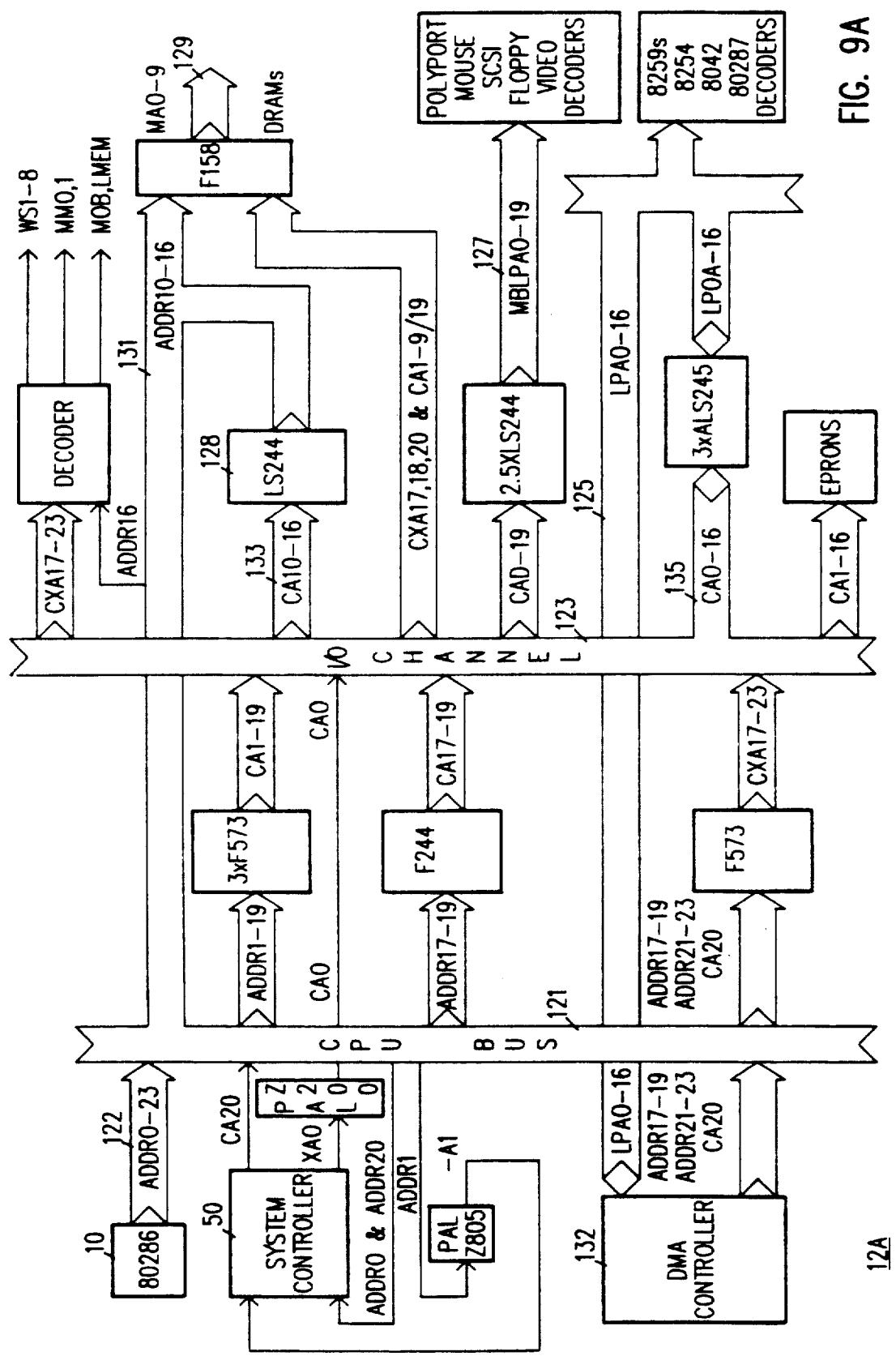
FIGS. 9A-9C are block diagrams of the structure of the address, data and control components of the bus employed in the microcomputer of FIG. 1.

As indicated elsewhere in this specification, bus 12 comprises three separate structures related to address, data and control signal transmission within the microcomputer. Referring to FIG. 9A, address bus 12a includes 5 different address buses of control unit 100, namely,

| CPU 121 | ADDR0-23. |
| I/O channel 123 | CA0-19 and CXA17-23. |
| local peripherals 125 | LPA0-16 |
| additional peripherals 127 | MBLPA0-19. |
| DRAMs 129 | MA0-9 |

CXA17-23 are latched by a signal designated UAL ($UAL = /BUSY + READY$).

It should be noted that the I/O channel portion 123 of bus 12a is a derivative of the address bus 122 of processor 10. Similarly, the local peripherals 125, additional peripherals 127 and DRAMs 129 portions of bus 12a are derivatives of the I/O channel portion 123. However, all control and timing signals are produced by system controller 50.

DRAM row address is address ADDR10-16 produced by processor 10 to provide zero wait state (0WS) operation at any speed. During DMA operation, address bits ADDR10-16 131 are connected to CA10-16 133 via a buffer 128.

The local peripheral address bus 125 is bi-directional, so that the DMA controller 132 generates CA0-16 during DMA cycles.

Figure 9B:
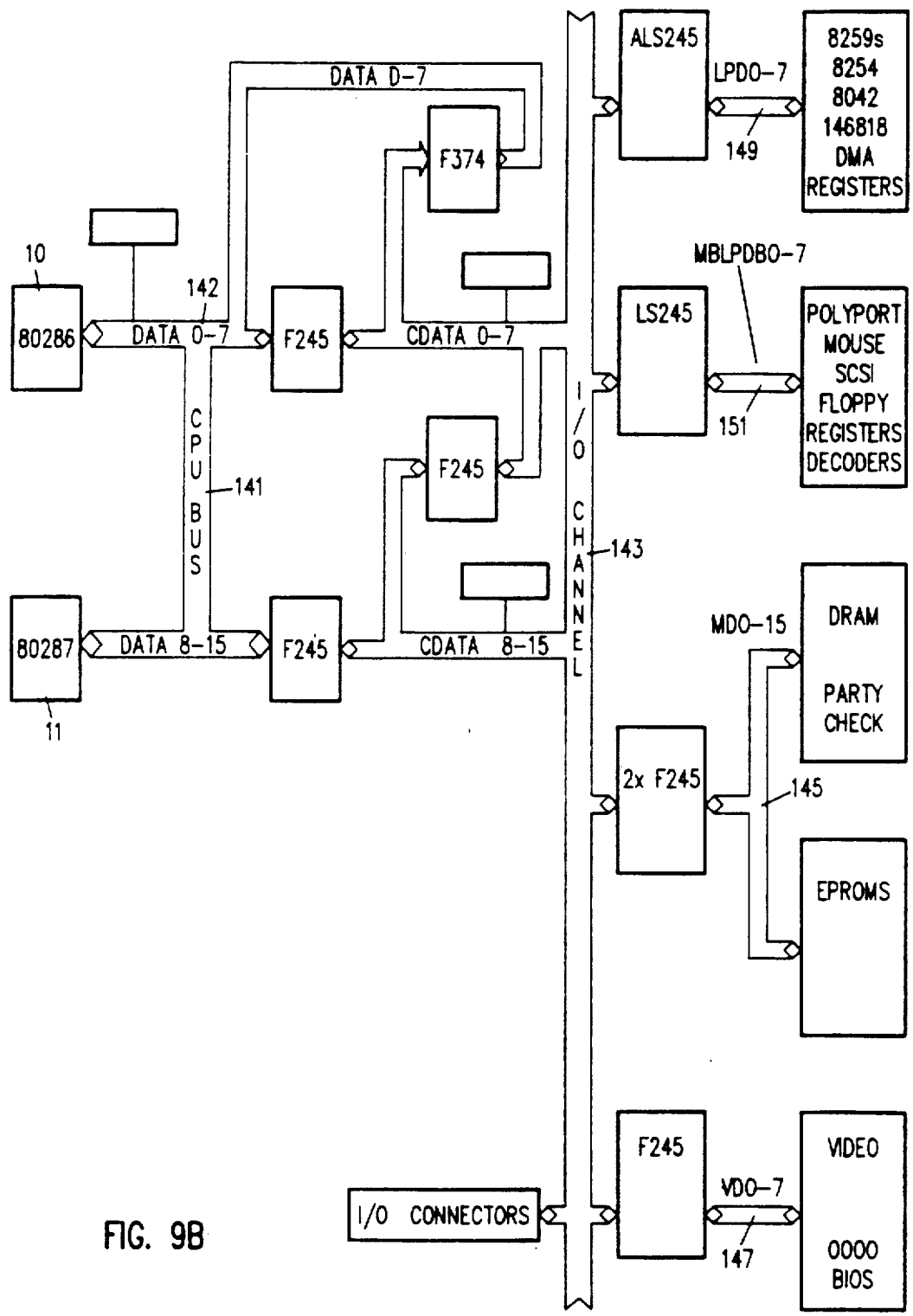

Referring now to FIG. 9B data, bus 12b includes 6 data buses, namely,

| CPU 141 | DATA0-15. |
| I/O channel 143 | CDATA0-15. |
| memory 145 | MD0-15. |
| video 147 | VD0-7. |
| local peripherals 149 | LPD0-7. |
| additional peripherals 151 | MBLPDB0-7 |

As for address bus 12a, the I/O channel portion 143 of data bus 12b is a derivative of the data bus 142 of processor 10. Memory 145, video 142, 147 local peripherals 149 and additional peripherals 151 portions of data bus 12b are derivatives of the I/O channel portion 143. All control and timing signals are produced by system controller 50.

Figure 9C:
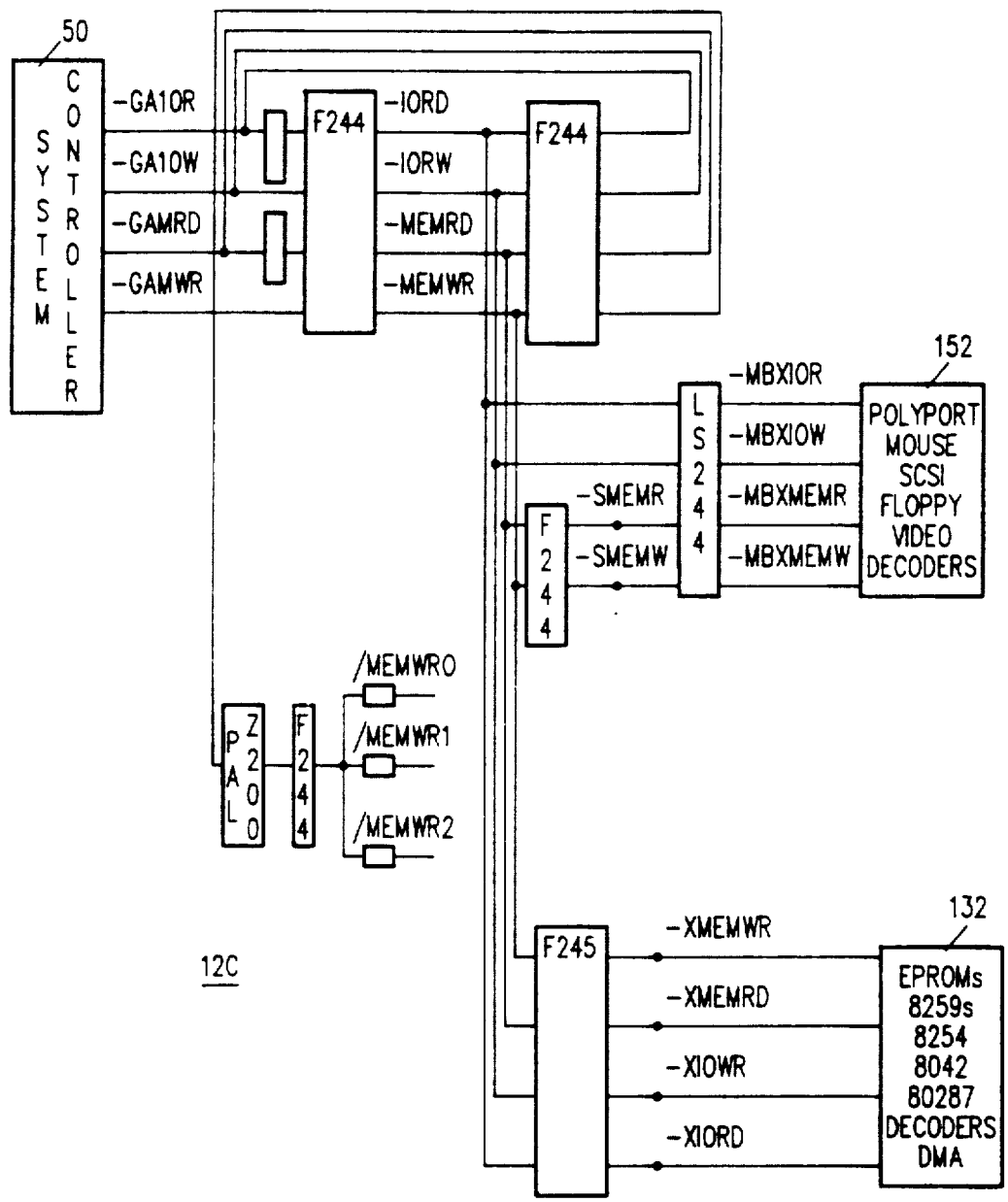

Control bus 12c, shown in detail in FIG. 9C, provides means for transmitting all control signals in the microcomputer. During a normal cycle, all control signals are delayed until the middle of the first TC. WRITE commands are terminated one-half SYSCLK signal earlier than READ commands to provide enough data hold time. Controls signals on the I/O channel are generated either by the system controller 50 or the DMA controller 132.

When accessing a peripheral device 153, the number of cycles depends only on the speed selected (6/8, 10 or 12 Mhz). Similarly, for memory or I/O, only the command signals generated differ. However, setup time, command length and hold time are identical for system memory and I/O functions.

Referring to FIG. 9D, an interrupt acknowledge cycle 161 is a special I/O access where no I/O command is generated on the bus, and an internal signal named INTA 163 is sent to the Peripheral Interrupt Controllers (PICs). Length of this cycle is the same as for any I/O access, namely, 6/8 MHz: 7 SYSCLK
10 MHz: 9 SYSCLK
12 MHz: 10 SYSCLK For access to system memory 103, depending on DRAM access time, it is possible to run with 0 wait state or 1 wait state. Selection is done by a jumper in logic circuit 53 for any speed of operation. However, for EPROM access, 1 wait state is required at 6/8 MHz, and 2 wait states are required at 10/12 MHz. System memory control bus timings are shown in FIGS. 9E and 9F.

In order for system controller 50 to match peripheral and memory device speed, control bus cycle time must be lengthened. Cycle time is lengthened by driving IOCHRDY low to add wait states. IOCHRDY is sampled in logic circuit 53 which generates an IORDY signal which is applied to system controller 50.

Cycle termination occurs when an active READY signal is sent to processor 10. For 8-bit device access, READY will follow the RDY signal produced by system controller 50. For 16-bit device access, READY assertion depends only on the speed and IOCHRDY state.

Depending on the type of device, i.e. 8 or 16 bit, and the speed, i.e. 6/8, 10 or 12 MHz, IOCHRDY must be low (de-asserted) after the command, and then kept low for maximum delay. When IOCHRDY is released, i. e. driven high, it must stay high for a minimum time. The end of the cycle will occur within a maximum time after this release, depending on the speed. In order to keep the shortest cycle length, IOCHRDY must be high (asserted) within a maximum time after the command. See Table IX for a summary of these commands and related requirements.

SYSTEM CONTROL

With continuing reference to FIG. 1, as stated elsewhere in this specification, system controller 50 incorporates state machine controllers 51a and 51b for access to system memory 103 and to other subsystems via bus 12. Controllers 51a and 51b are similar in design to that of the state machine bus controller described in the incorporated U.S. application for patent identified elsewhere in this specification.

State machine memory controller 51a and state machine bus controller 51b of the present invention operate concurrently. Each state machine generally comprise flip-flops, combinatorial logic and signal conditioning circuitry for producing signals in accordance with equations given in Tables I-A and I-B in response to various input signals and conditions, also summarized in the tables.

Details of state machine memory controller 51a section of system controller 50 is shown in and described in connection with FIG. 6A, lower portion and FIG. 7E, upper portion. The details of state machine bus controller 51b section of system controller 50 are also dispersed in this specification and are included in the upper portion of FIG. 6A, FIG. 8A and the lower portion of FIG. 7E.

State machine bus controller section 51b, while similar in design to the state machine bus controller described in the incorporated patent application, further includes wait-state counter 200. Wait-state counter 200 extends the timing of control signals, thus prolonging the bus cycle controlled thereby in response to wait-state information produced by system controller 50. Thus, "wait-states" are added to a bus cycle by delaying the READY signal in response to delayed IORDY signal. With respect to memory access cycles, RAS, MAS and REFRESH control signals are unaffected. In order to add wait-states to an access of system memory 103 by state machine memory controller 51a, CAS signal is maintained in its present state for a longer time.

In order to operate cooperatively, each controller 51a, 51b monitors the same signals, or signals derived from the same signals, representing information required to begin and end both memory access and bus cycles respectively. Thus, both controllers 51a, 51b monitor S0, S1, MMCYC, ROB REFRESH and T10 (i.e., status signals from processor 10) to initiate a bus cycle and/or a memory access cycle. The READY signal, generated by the bus controller 51b must be monitored by the state machine memory controller 51a so that CAS, -SCLK2, SD MODE, SDCLR and -READY signals will be timely terminated at the end of a memory access cycle.

In the preferred embodiment of the present invention, the state machine memory controller 51a and the state machine bus controller 51b of system controller 50 are fabricated on a single semiconductor integrated circuit. In this way, delays associated with driving signals on and off separate semiconductor integrated circuits are avoided and system performance is maximized.

While the present invention has been particularly shown and described with respect to a preferred embodiment thereof, it would be understood by those skilled in the art that changes in form and detail may be made without departing from the spirit of the invention or exceeding the scope of the appended claims.

TABLE I-A

```
/******************************************************/

/**         INPUTS                    **/

PIN 1      = CLK ;
PIN 2      = MEM ;
PIN 3      = !XFAST ;
PIN 4      = BUSY ;
PIN 5      = !RDY ;
PIN 6      = IOCHRDY ;
PIN 7      = !MCS16 ;
PIN 8      = !IOCS16 ;
```

```
PIN 9     = SYSCLK ;
PIN 10    = !NPCS ;
PIN 11    = !OWS ;
PIN 13    = !OE ;
PIN 14    = NC1 ;
PIN 23    = NC2 ;

/**       OUTPUTS                    **/

PIN 15    = !READY ;
PIN 16    = IORDY ;
PIN 19    = !X1 ;

/**       INTERNAL VARIABLES         **/

PIN 17    = !W1 ;
PIN 18    = !W0 ;
PIN 20    = !X2 ;
PIN 21    = !WORD ;
PIN 22    = !X3 ;

/***********************************************************/

/**       OUTPUT EQUATIONS           **/

X1.d      = BUSY  & SYSCLK
          # BUSY  & !SYSCLK  & X1;

X2.d      = BUSY  & WORD  & SYSCLK        /* X2 is WORD delayed
                                              1 SYSCLK*/
          # BUSY  & WORD  & !SYSCLK & X2; /* and lasts 1 SYSCLK*/

X3.d      = BUSY  & WORD  & SYSCLK  & X2
          # BUSY  & WORD  & !SYSCLK  & X3;

WORD.d    = BUSY  & !X1  & SYSCLK  & MEM  & MCS16   /* window is
                                                       open      */
          # BUSY  & !X1  & SYSCLK  & !MEM & IOCS16  /* 1st half of
                                                       1st       */
          # BUSY  & !X1  & SYSCLK  & !MEM & NPCS    /* TC, WORD
                                                       flag is   */
          # BUSY  & WORD;                           /* latched   */

W0.d      = IOCHRDY  & !SYSCLK            /* W0-W1 is a 2-bit shift
                                              register           */
          # IOCHRDY  & SYSCLK  & W0;      /* reset by IOCHRDY, shifts
                                              at TC              */
                                          /* transition          */

W1.d      = IOCHRDY  & !SYSCLK  & W0      /* both are high when
                                              IOCHRDY            */
          # IOCHRDY  & SYSCLK  & W0  & W1; /* is not used by
                                              adapter            */
```

```
!IORDY.d = !IOCHRDY                    /* IORDY is high when
                                          IOCHRDY is              */
         # !XFAST   & !W0              /* not used by adapter,
                                          IORDY                   */
         # XFAST    & !W1              /* becomes high at the end
                                          of next                 */
         # !IORDY   & SYSCLK;          /* TC following IOCHRDY
                                          going high              */
                                       /* if 8 MHz and 2 TC if
                                          12 Mhz                  */

READY.d  = IORDY   & RDY
         # WORD    & !XFAST  & IORDY  & X2  & SYSCLK  & BUSY
         # WORD    & XFAST   & IORDY  & X3  & SYSCLK  & BUSY
         # READY   & !SYSCLK;          /* there are 2 TC following
                                          IOCHRDY                 */
                                       /* going high @8MHz, and
                                          3 @12MHz                */

EXPANDED PRODUCT TERMS

IORDY.d  =>
    !IOCHRDY
  # !XFAST & !W0
  # XFAST & !W1
  # !IORDY & SYSCLK

WORD.d  =>
    MEM & BUSY & MCS16 & !X1 & SYSCLK
  # IOCS16 & !MEM & BUSY & !X1 & SYSCLK
  # NPCS & !MEM & BUSY & !X1 & SYSCLK
  # WORD & BUSY

W0.d  =>
    IOCHRDY & !SYSCLK
  # W0 & IOCHRDY & SYSCLK

W1.d  =>
    W0 & IOCHRDY & !SYSCLK
  # W0 & W1 & IOCHRDY & SYSCLK

X1.d  =>
    BUSY & SYSCLK
  # BUSY & X1 & !SYSCLK

X2.d  =>
    WORD & BUSY & SYSCLK
  # WORD & BUSY & X2 & !SYSCLK
```

```
X3.d    =>
    WORD & BUSY & X2 & SYSCLK
  # WORD & BUSY & X3 & !SYSCLK

READY.d  =>
    IORDY & RDY
  # !XFAST & IORDY & WORD & BUSY & X2 & SYSCLK
  # XFAST & IORDY & WORD & BUSY & X3 & SYSCLK
  # READY & !SYSCLK
```

TABLE I-B

```
/****************************************************/
/*        WAIT STATE GENERATION & MEMORY DECODING   */
/****************************************************/

/**     INPUTS          **/

PIN 1    = !REF ;           /* '0' during refresh operation     */
PIN 2    = MEM ;            /* '1' during memory access, '0' for
                                   I/O                          */
PIN 3    = !XFAST ;         /* '0' when 12 MHz operation        */
PIN [4..10] = [A17..A23] ;
PIN 11   = !BNK1 ;          /* jumper IN when bank1 SIMMs
                                   installed                    */
PIN 13   = !BNK2 ;          /* jumper IN when bank2 SIMMs
                                   installed                    */
PIN 14   = !ZEROWS ;
PIN 23   = A16 ;

/**     OUTPUTS         **/

PIN 22   = MM0 ;            /* MM0,MM1 indicate memory is being */
PIN 15   = MM1 ;            /* accessed, see table              */
PIN 16   = !MOB ;           /* active when accessing on-board
                                   RAM or PROM                  */
PIN 17   = !LMEM ;          /* active when memory address under
                                   1MB                          */
PIN 18   = WS8 ;            /* WS8..4:number of WAIT STATES for
                                   SYSTEM                       */
PIN 19   = WS4 ;            /* CONTROLLER use                   */
PIN 20   = WS2 ;
PIN 21   = WS1 ;

/**     INTERMEDIATE VARIABLES     **/

FIELD ADDRESS           = [A16..A23];

PROM_REAL      = address:[E0000..FFFFF] & MEM ;
PROM_VIRTUAL   = address:[FE0000..FFFFFF] & MEM ;
PROM           = PROM_REAL # PROM_VIRTUAL ;

BANK0          = address:[0..07FFFF] & MEM ;       /* 256KB DRAMs */
BANK1          = address:[080000..09FFFF] & MEM ;  /* 256KB DRAMs */
BANK2          = address:[100000..2FFFFF] & MEM ;  /* 1 MB DRAMs  */
RAM            = BANK0 # BANK1 & BNK1 # BANK2 & BNK2 ;

/**************************************************** */
```

```
/**     OUTPUT EQUATIONS      **/

MOB     = RAM & !REF
        # PROM & !REF ;

LMEM    = address:[0..FFFFF] & MEM ;

WS8     = !MOB & XFAST ;

WS4     = !MOB;

!WS2    = !MOB
        # MOB & ZEROWS & !A19
        # MOB & ZEROWS & !A18
        # MOB & ZEROWS & !A17;

!WS1    = PROM & XFAST ;

!MM0    = BANK1 & !REF
        # PROM & !REF ;

!MM1    = BANK0 & !REF
        # PROM & !REF ;
```

|        | MM0 | 1 | MM1 |
|--------|-----|---|---|---|
| EPROM  | 1 | 0 | 1 | 0 |
| BANK0  | 1 | 1 | 1 | 0 |
| BANK1  | 1 | 0 | 1 | 1 |
| BANK2  | 1 | 1 | 1 | 1 |

|                  |             | WS8 | WS4 | WS2 | WS1 |
|------------------|-------------|-----|-----|-----|-----|
| MOB 0WS          | : 1 TC      | 0 | 0 | 0 | 1 |
| MOB /0WS         | : 1 TW + 1 TC | 0 | 0 | 1 | 1 |
| /MOB @ 12 MHz    | : 8 TW + 1 TC | 1 | 1 | 0 | 1 |
| /MOB @ 6 OR 8    | : 5 TW + 1 TC | 0 | 1 | 0 | 1 |
| EPROM @ 6 OR 8   | : 1 TW + 1 TC | 0 | 0 | 1 | 1 |
| EPROM @ 12 MHZ   : 2 TW + 1 TC | 0 | 0 | 1 | 0 |

EXPANDED PRODUCT TERMS

```
LMEM  =>
    MEM & !A20 & !A21 & !A22 & !A23

MM0   =>
     !REF & MEM & !A20 & !A21 & !A22 & !A23 & !A17 & !A18 & A19
   # !REF & MEM & A20 & A21 & A22 & A23 & A17 & A18 & A19
   # !REF & MEM & !A20 & !A21 & !A22 & !A23 & A17 & A18 & A19

MM1   =>
     !REF & MEM & !A20 & !A21 & !A22 & !A23 & !A19
   # !REF & MEM & A20 & A21 & A22 & A23 & A17 & A18 & A19
   # !REF & MEM & !A20 & !A21 & !A22 & !A23 & A17 & A18 & A19
```

```
WS1  =>
    XFAST & MEM & A20 & A21 & A22 & A23 & A17 & A18 & A19
  # XFAST & MEM & !A20 & !A21 & !A22 & !A23 & A17 & A18 & A19

PROM_REAL =>
    MEM & !A20 & !A21 & !A22 & !A23 & A17 & A18 & A19

WS2  =>
    !MOB
  #ZEROWS & MOB & !A19
  #ZEROWS & MOB & !A18
  #ZEROWS & MOB & !A17

PROM =>
    MEM & !A20 & !A21 & !A22 & !A23 & A17 & A18 & A19
  # MEM & A20 & A21 & A22 & A23 & A17 & A18 & A19

WS4  =>
    MOB

MOB =>
    !REF & MEM & !A20 & !A21 & !A22 & !A23 & !A19
  # !REF & MEM & !A20 & !A21 & !A22 & !A23 & !A17 & !A18 & BNK1 &
    A19
  # !REF & MEM & !A20 & A21 & !A22 & !A23 & BNK2
  # !REF & MEM & A20 & !A21 & !A22 & !A23 & BNK2
  # !REF & MEM & A20 & A21 & A22 & A23 & A17 & A18 & A19
  # !REF & MEM & !A20 & !A21 & !A22 & !A23 & A17 & A18 & A19

RAM =>
    MEM & !A20 & !A21 & !A22 & !A23 & !A19
  # MEM & !A20 & !A21 & !A22 & !A23 & !A17 & !A18 & BNK1 & A19
  # MEM & A20 & !A21 & !A22 & !A23 & BNK2
  # MEM & !A20 & A21 & !A22 & !A23 & BNK2

WS8  =>
    MOB
  # !XFAST

BANK0 =>
    MEM & !A20 & !A21 & !A22 & !A23 & !A19

BANK1 =>
    MEM & !A20 & !A21 & !A22 & !A23 & !A17 & !A18 & A19
```

```
BANK2 =>
    MEM & !A20 & A21 & !A22 & !A23
  # MEM & A20 & !A21 & !A22 & !A23 address =>
    A16 , A17 , A18 , A19 , A20 , A21 , A22 , A23

PROM_VIRTUAL =>
    MEM & A20 & A21 & A22 & A23 & A17 & A18 & A19

LMEM.oe =>
    1

MM0.oe =>
    1

MM1.oe =>
    1

WS1.oe =>
    1

WS2.oe =>
    1

WS4.oe =>
    1

MOB.oe =>
    1

WS8.oe =>
    1

*/
```

TABLE II

| INPUT SIGNALS | | OUTPUT SIGNALS | |
|---|---|---|---|
| CLKPER | 46 | TIMCLK | 33 |
| CLKDSK | 40 | DSKCLK | 38 |
| CLKSYS | 41 | SERCLK | 39 |
| —CLK286 | 23 | SYSCLK | 34 |
| SELSPD | 47 | —286CLK | 37 |
| SPDSEL | 45 | | |
| —TEST | 25 | | |
| —RESET | 24 | | |
| —S1 | 21 | | |
| —NPCS | 48 | | |
| —KYBRST | 26 | | |

TABLE III-A

| —286CLK Freq | SPDSEL | —NPCS | —KYBRST |
|---|---|---|---|
| 24 mhz | High | Low | Low |
| 16 mhz | Low | High | Low |
| 12 mhz | High | High | Low |

TABLE III-B

| —286CLK Freq (mhz) | SPDSEL |
|---|---|
| 16 | Low |
| 12 | High |

TABLE IV

| SPEED/WS | CYCLE | ACCESS | MEMORY | MEM CYCLE |
|---|---|---|---|---|
| 6/1 | 500 | 415 | 150 | 300 |
| 6/0 | 333 | 250 | 150 | 300 |
| 8/1 | 375 | 312 | 150 | 300 |
| 8/0 | 250 | 187 | 120 | 240 |
| 10/1 | 300 | 250 | 120 | 240 |
| 10/0 | 200 | 150 | 100 | 200 |
| 12/1 | 250 | 207 | 120 | 240 |
| 12/0 | 166 | 125 | 80 | 160 |

TABLE V-A

| INPUT SIGNALS | | OUTPUT SIGNALS | | BIDIRECTIONAL SIGNALS | |
|---|---|---|---|---|---|
| —CLK286 | 23 | —RAS0 | 10 | CA0 | 6 |
| MM0 | 13 | —RAS1 | 67 | —MEMWRITE | 42 |
| MM1 | 14 | —RAS2 | 66 | —MEMREAD | 43 |
| LMEM | 18 | —CASL | 60 | | |
| MEM | 17 | —CASH | 61 | | |
| —REFRESH | 51 | MAS | 65 | | |
| —S1 | 21 | | | | |
| —S0 | 22 | | | | |
| A0 | 15 | | | | |
| —BHE | 16 | | | | |
| —ACK | 49 | | | | |

TABLE V-B

FOR MEM, LMEM = 1, AND —REFRESH = 1:

| | MM0 | MM1 | —ACK | —AEN1 | CA0 | —BHE | —MR or —MW | —S0 OR —S1 |
|---|---|---|---|---|---|---|---|---|
| RAS0 | 1 | 0 | 1 | 1 | X | X | 1 | 0 |
|  | 1 | 0 | 0 | X | X | X | 0 | 1 |
| RAS1 | 0 | 1 | 1 | 1 | X | X | 1 | 0 |
|  | 0 | 1 | 0 | X | X | X | 0 | 1 |
| RAS2 | 1 | 1 | 1 | 1 | X | X | 1 | 0 |
|  | 1 | 1 | 0 | X | X | X | 0 | 1 |
| CASL | X | X | 1 | 1 | 0 | X | 1 | 0 |
|  | X | X | 0 | 1 | 0 | X | 0 | 1 |
|  | X | X | 0 | 0 | 0 | X | 0 | 1 |
| CASH | X | X | 1 | 1 | X | 0 | 1 | 0 |
|  | X | X | 0 | 1 | X | 0 | 0 | 1 |
|  | X | X | 0 | 0 | 1 | X | 0 | 1 |

TABLE V-C

| TIME | MIN | MAX | UNITS |
|---|---|---|---|
| T1 | 5 | 28 | ns |
| T2 | 5 | 24 | ns |
| T3 | 5 | 24 | ns |
| T4 | 5 | 18 | ns |
| T5 | 5 | 22 | ns |

TABLE VI

| INPUT SIGNALS | | OUTPUT SIGNALS | |
|---|---|---|---|
| —RESET | 24 | SYSRST | 32 |
| —CLK286 | 23 | RESET286 | 31 |
| —KYBRST | 26 | | |
| MEM | 17 | | |
| —S0 | 22 | | |
| —S1 | 21 | | |
| A1 | 52 | | |

TABLE VII-A

| INPUT SIGNALS | | OUTPUT SIGNALS | | BIDIRECTIONAL SIGNALS | |
|---|---|---|---|---|---|
| —CLK286 | 23 | DT | 27 | —MEMWRITE | 42 |
| MEM | 17 | —ENH | 4 | —MEMREAD | 43 |
| —S0 | 22 | —ENL | 5 | —IOREAD | 2 |
| —S1 | 21 | —ENX | 64 | | |
| —BHE | 16 | —ENR | 63 | | |
| A0 | 15 | —INTACK | 29 | | |
| —DMAEN | 50 | —IOWRITE | 3 | | |
| —ACK | 49 | BUSY | 8 | | |
| —NPCS | 48 | —READYL | 9 | | |
| IORDY | 55 | —FIRST | 28 | | |
| —MMCS16 | 12 | CA0 | 6 | | |
| —IOCS16 | 11 | CONAN | 62 | | |

TABLE VII-B

| REQUESTED OPERATION | —S0 | —S1 | A0 | —BHE | MEM | —A1 |
|---|---|---|---|---|---|---|
| Memory-Write Word | 0 | 1 | 0 | 0 | 1 | X |
| Memory-Write Hi Byte | 0 | 1 | 1 | 0 | 1 | X |
| Memory-Write Lo Byte | 0 | 1 | 0 | 1 | 1 | X |
| I/O-Write Word | 0 | 1 | 0 | 0 | 0 | X |
| I/O-Write Hi Byte | 0 | 1 | 1 | 0 | 0 | X |
| I/O-Write Lo Byte | 0 | 1 | 0 | 1 | 0 | X |
| Memory-Read Word | 1 | 0 | 0 | 0 | 1 | X |
| Memory-Read Hi Byte | 1 | 0 | 1 | 0 | 1 | X |
| Memory-Read Lo Byte | 1 | 0 | 0 | 1 | 1 | X |
| I/O-Read Word | 1 | 0 | 0 | 0 | 0 | X |
| I/O-Read Hi Byte | 1 | 0 | 1 | 0 | 0 | X |
| I/O-Read Lo Byte | 1 | 0 | 0 | 1 | 0 | X |
| CPU Halt | 0 | 0 | X | X | 1 | 1 |
| CPU Shutdown | 0 | 0 | X | X | 1 | 0 |
| Interrupt Acknowledge | 0 | 0 | X | X | 0 | X |

TABLE VII-C

| ENABLE | WORD | HI BYTE | LO BYTE |
|---|---|---|---|
| —ENL | 0 | 0 | 0 |
| —ENH | 0 | 0 | 0 |
| —ENX | 1 | 1 | 1 |
| —ENR | 1 | 1 | 1 |

TABLE VII-D

| ENABLE | WORD | HI BYTE | LO BYTE |
|---|---|---|---|
| —ENL | X/1 | X | 0 |
| —ENH | X/0 | 0 | X |
| —ENX | X/0 | 0 | X |
| —ENR | X/0 | X | 1 |

[Second half of cycle.
[First half of cycle.

TABLE VII-E

| ENABLE | WORD | HI BYTE | LO BYTE |
|---|---|---|---|
| —ENL | 0/1 | 1 | 0 |
| —ENH | X/0 | 0 | X |
| —ENX | 1/0 | 0 | 1 |
| —ENR | 1/1 | 1 | 1 |

[Second half of cycle.
[First half of cycle.

TABLE VII-F

| TIME | MIN | MAX | UNITS |
|---|---|---|---|
| T1 | 6 | 28 | ns |
| T2 | 7 | 35 | ns |
| T3 | 8 | 38 | ns |
| T4 | 7 | 23 | ns |
| T5 | 5 | 29 | ns |
| T6 | 5 | 32 | ns |

TABLE VII-F-continued

| TIME | MIN | MAX | UNITS |
|---|---|---|---|
| T7 | - | 31 | ns |

TABLE VII-G

| TIME | MIN | MAX | UNITS |
|---|---|---|---|
| T1 | 7 | 35 | ns |
| T2 | 6 | 28 | ns |
| T3 | 7 | 35 | ns |
| T4 | 7 | 34 | ns |
| T5 | 10 | 20 | ns |
| T6 | 9 | 17 | ns |
| T7 | 6 | 33 | ns |

TABLE VIII-A

| INPUT SIGNALS | | OUTPUT SIGNALS | |
|---|---|---|---|
| —CLK286 | 23 | —RDY | 30 |
| —RDYINP | 20 | ALE | 44 |
| ALEINP | 19 | | |
| WS8 | 59 | | |
| WS4 | 58 | | |
| WS2 | 57 | | |
| WS1 | 56 | | |

TABLE VIII-B

| WS8 | WS4 | WS2 | WS1 | HEX | # OF WAIT STATES | # OF STROBE CYCLES | # OF CYCLES |
|---|---|---|---|---|---|---|---|
| 0 | 0 | 0 | 0 | 0 | 0 | 1 | 2 |
| 0 | 0 | 0 | 1 | 1 | 0 | 1 | 2 |
| 0 | 0 | 1 | 1 | 3 | 1 | 2 | 3 |
| 0 | 0 | 1 | 0 | 2 | 2 | 3 | 4 |
| 0 | 1 | 1 | 0 | 6 | 3 | 4 | 5 |
| 0 | 1 | 1 | 1 | 7 | 4 | 5 | 6 |
| 0 | 1 | 0 | 1 | 5 | 5 | 6 | 7 |
| 0 | 1 | 0 | 0 | 4 | 6 | 7 | 8 |
| 1 | 1 | 0 | 0 | C | 7 | 8 | 9 |
| 1 | 1 | 0 | 1 | D | 8 | 9 | 10 |
| 1 | 1 | 1 | 1 | F | 9 | 10 | 11 |
| 1 | 1 | 1 | 0 | E | 10 | 11 | 12 |
| 1 | 0 | 1 | 0 | A | 11 | 12 | 13 |
| 1 | 0 | 1 | 1 | B | 12 | 13 | 14 |
| 1 | 0 | 0 | 1 | 9 | 13 | 14 | 15 |
| 1 | 0 | 0 | 0 | 8 | 14 | 15 | 16 |

TABLE VIII-C

| CPU SPEED (mhz) | WAIT STATES | DRAM CYCLE TIME | MIN DRAM ACCESS TIME | MIN DRAM CYCLE TIME |
|---|---|---|---|---|
| 6 | 1 | 500 (1.0X) | 200 ns | 400 ns |
| 6 | 0 | 333 (1.5X) | 150 ns | 300 ns |
| 8 | 1 | 375 (1.3X) | 150 ns | 300 ns |
| 8 | 0 | 250 (2.0X) | 120 ns | 240 ns |
| 10 | 1 | 300 (1.6X) | 150 ns | 300 ns |
| 10 | 0 | 200 (2.5X) | 100 ns | 200 ns |
| 12 | 1 | 250 (2.0X) | 120 ns | 240 ns |
| 12 | 0 | 166 (3.0X) | 80 ns | 160 ns |

TABLE IX

| | IOCHRDY SAMPLED at the end of | | IOCHRDY must stay stable for | | CYCLE end following IOCHRDY release |
|---|---|---|---|---|---|
| | 8-bit device | 16-bit device | 8-bit device | 16-bit device | |
| IOCHRDY TRANSITION | | | | | |
| High to Low | | | | | |
| 8 MHz | 5th TC | 2nd TC | (*) | (*) | |
| 10 MHz | 5th TC | 2nd TC | (*) | (*) | |
| 12 MHz | 6th TC | 3rd TC | (*) | (*) | |
| Low to High | | | | | |
| 8 MHz | () | () | >1 TC & (*) | >1 TC & (*) | after 2 TC |
| 10 MHz | () | () | >2 TC & (*) | >2 TC & (*) | after 3 TC |
| 12 MHz | () | () | >2 TC & (*) | >2 TC & (*) | after 3 TC |
| WITHOUT TRANSITION | | | | | |
| IOCHRDY HIGH | | | | | |
| 8 MHz | 4th TC | 1st TC | >1 TC & (*) | >1 TC & (*) | after 2 TC |
| 10 MHz | 5th TC | 1st TC | >2 TC & (*) | >2 TC & (*) | after 3 TC |
| 12 MHz | 6th TC | 1st TC | >2 TC & (*) | >2 TC & (*) | after 3 TC |

(*) must satisfy setup and hold times
(**) next TC transition following IOCHRDY trailing edge

I claim:

1. Apparatus for controlling operations performed by controllable devices in response to command signals representing requested operations from a microprocessor, said apparatus comprising:

an interface bus for transmitting signals representing data, control and address information and microprocessor commands;

a first state machine controller means coupled to said interface bus and the microprocessor and having a first set of programmable states responsive to the command signals from the microprocessor and to control signals from a first set of controllable devices coupled to said interface bus, for producing a first set of interface control signals for controlling operation of the first set of controllable devices and the microprocess, whereby said programmable states adapt the function and timing of said first set of interface control signals for automatically accommodating operational characteristics of said first set of controllable devices;

said first set of programmable states defining a first set of access cycles;

a second state machine controller means coupled to said first state machine means, said interface bus and the microprocessor and having a second set of programmable states responsive to the command signals from the microprocessor, to control signals from a second set of controllable devices coupled to said interface bus and to at least one of said first set of interface control signals, for producing a second set of interface control signals for controlling the operations of the second set of controllable devices and the microprocessor, whereby said programmable states adapt the function and timing of said second set of interface control signals for automatically accommodating operational characteristics of said second set of controllable devices;

said second set of programmable states defining a second set of access cycles; and clocking means coupled to said first and second state machine controller means for producing clock signals for controlling the duration of said programmable states and the timing of transition from one of said programmable states to the next successive programmable state;

said requested operation being controlled by one of said sets of first and second sets of access cycles.

2. Apparatus as in claim 1 wherein said one of said first set of interface control signals indicates that said apparatus is ready to process a next command signal from the microprocessor.

3. Apparatus as in claim 1 wherein said one of said first set of interface control signals is produced upon completion of a requested operation performed by either the first or second set of controllable devices.

4. Apparatus as in claim 1 wherein said first state machine controller means includes counting means for controlling the timing of some of said first set of interface control signals.

5. Apparatus as in claim 4 wherein said some of said first set of interface control signals includes said one of said first set of interface control signals for controlling the timing of some of said second set of interface control signals.

6. Apparatus as in claim 4 wherein said counting means controls the number of wait states to be incorporated into the timing of said some of said first set of interface control signals.

7. Apparatus as in claim 1 wherein each of said first and second access cycles comprises a clock flow of programmable states of said first and second state machine controller means, respectively.

8. Apparatus as in claim 1 wherein:
said first set of controllable devices include add-on memory devices coupled to said interface bus;
said first set of interface control signals include add-on memory control strobe signals for controlling access to said add-on memory devices;
said second set of controllable devices include system memory devices; and
said second set of interface control signals include system memory control strobe signals for controlling access to said system memory devices.

9. Apparatus as in claim 8 wherein the timing of said control strobe signals is the same for add-on memory and system memory devices.

10. Apparatus as in claim 8 wherein the timing of said control strobe signals is different for add-on memory and system memory device.

11. Apparatus in claim 8 wherein the timing of said control strobe signals for system memory devices is fastener than the timing of control strobe signals for add-on memory devices.

12. Apparatus as in claim 8 wherein said access controlled by said add-on and system memory control strobe signals comprises a read operation whereby data stored in said add-on and system memory devices is retrieved.

13. Apparatus as in claim 8 wherein said access controlled by said add-on and system memory control strobe signals is a write operation whereby data is stored in said memory devices.

14. Apparatus as in claim 1 wherein the timing of said first and second state machine controller means is the same as the timing of said microprocessor.

15. Apparatus as in claim 1 wherein the timing of said first and second state machine controller means is slower than the timing of said microprocessor.

16. Apparatus as in claim 1 wherein the function and timing of said first and second sets of interface control signals are changed during said first and second access cycles.

17. Apparatus as in claim 16 wherein the function and timing of said first and second sets of interface control signals are changed during said first and second access cycles, respectively, in response to control signals from said first and second sets of controllable devices.

18. Apparatus as in claim 1 wherein the command signals from the microprocessor comprise digital words having the same number of bits per word as the number of bits per word in digital words comprising control signals from controllable devices.

19. Apparatus as in claim 18 wherein the number of bits per word is 8.

20. Apparatus as in claim 18 wherein the number of bits per word is 16.

21. Apparatus as in claim 1 wherein:
said command signals comprise digital words having a different number of bits per word as the number of bits per word in digital words comprising control signals from said first and second sets of controllable devices; and
said first and second state machine controller means include first and second translation means, respectively, for translating the operations requested by said command signals into the same number of bits per word as the number of bits per word comprising control signals from said first and second sets of controllable devices.

22. Apparatus as in claim 21 wherein the command signals from the microprocessor comprise digital words having a greater number of bits per word as the number of bits per word in digital words comprising control signals from said first and second sets of controllable devices.

23. Apparatus as in claim 22 wherein the number of bits per command signal word is 16 and the number of bits per controllable device word is 8.

24. Apparatus as in claim 21 wherein the command signals from the microprocessor comprise digital words having a fewer number of bits per word as the number of bits per word in digital words comprising control signals from said first and second of controllable devices.

25. Apparatus as in claim 24 wherein the number of bits per command signal word is 8 and the number of bits per controllable device word is 16.

26. Apparatus as in claim 1 wherein:
said first set of controllable devices include peripheral devices; and
said first set of interface control signals include access control signals for controlling access to said peripheral devices.

27. Apparatus as in claim 1 wherein said first and second state machine controller means includes inhibit means for producing a halt/shutdown signals for inhibiting said first and second sets of interface control signals when operation of the microprocessor is stopped.

28. A method for controlling operations performed by controllable devices in response to command signals representing requested operations from a microprocessor, said method comprising the steps of:

transmitting signals representing data, control and address information and microprocessor commands along an interface bus;

producing a first set of interface control signals in response to a first set of programmable states derived from command signals from the microprocessor and control signals from a first set of controllable devices, whereby said programmable states adapt the function and timing of the first set of interface control signals for automatically accommodating operational characteristics of said first set of controllable devices;

said first set of programmable states defining a first set of access cycles;

producing a second set of interface control signals in response to a second set of programmable states derived from the command signals from the microprocessor, control signals from a second set of controllable devices and from at least one of said first set of interface control signals, whereby said programmable states adapt the function and timing of the second set of interface control signals for automatically accommodating operational characteristics of said second set of controllable devices; and said second set of programmable states defining a second set of access cycles;

producing clock signals for controlling the duration of said first and second sets of programmable states and the timing of transition from one of said programmable states to the next successive programmable state;

said requested operation being controlled by one of said first and second sets of access cycles.

29. The method as in claim 28 wherein said one of said first set of interface control signals indicates that the next command signal may be processed.

30. The method as in claim 28 wherein the step of producing said first set of interface control signals includes the step of producing said one of said first set of interface control signals upon completion of a requested operation performed by either said first or second set of controllable devices.

31. The method as in claim 28 wherein the step of producing the first set of interface control signals includes the step of controlling the timing of some of said first set of interface control signals.

32. The method as in claim 31 wherein the step of controlling the timing of some of said first set of interface control signals includes the step of controlling the timing of said one of said first set of interface control signals for controlling the timing of some of said second set of interface control signals.

33. The method as in claim 31 wherein the step of controlling the timing of some of said first set of interface control signals includes the step of controlling the number of wait states to be incorporated into the timing of said some of said first set of interface control signals.

34. The method as in claim 28 wherein each of said first and second access cycles comprises a clocked flow of programmable states.

35. The method as in claim 28 wherein said first set of controllable devices include add-on memory devices coupled to said interface bus;

said step of producing said first set of interface control signals includes the step of producing add-on memory control strobe signals for controlling access to said add-on memory devices;

said second set of controllable devices include system memory devices; and said step of producing said second set of interface control signals includes the step of producing system memory control strobe signals for controlling access to said system memory devices.

36. The method as in claim 35 wherein the timing of said control strobe signals is the same for add-on memory and system memory devices.

37. The method as in claim 35 wherein the timing of said control strobe signals is different for add-on memory and system memory devices.

38. The method as in claim 35 wherein the timing of said control strobe signals for system memory devices is faster than the timing of control strobe signals for add-on memory devices.

39. The method as in claim 28 wherein the timing of said first and second sets of interface control signals is the same as the timing of command signals from said microprocessor.

40. The method as in claim 35 wherein said access controlled by said add-on memory and the system memory control strobe signals is a write operation whereby data is stored in said memory devices.

41. The method as in claim 28 wherein the timing of said first and second sets of interface control signals is slower than the timing of command signals from said microprocessor.

42. The method as in claim 28 wherein the steps of producing said first and second sets of interface control signals include the steps of changing the function and timing thereof during said first and second access cycles.

43. The method as in claim 42 wherein the steps of changing the function and timing of said first and second sets of interface control signals during said first and second access cycles, respectively, include the steps of responding to control signals from said first and second sets of controllable devices.

44. The method as in claim 35 wherein said access controlled by said add-on memory and system memory control strobe signals comprise a read operation whereby data stored in said add-on memory and system memory devices is retrieved.

45. The method as in claim 28 wherein the command signals from the microprocessor comprise digital words having the same number of bits per word as the number of bits per word in digital words comprising control signals from controllable devices.

46. The method as in claim 45 wherein the number of bits per word is 8.

47. The method as in claim 45 wherein the number of bits per word is 16.

48. The method as in claim 28 wherein said command signals comprise digital words having a different number of bits per word than the number of bits per word in digital words comprising control signals from said first and second sets of controllable devices; and said steps of producing said first and second interface control signals include the steps of translating the operations requested by said command signals into the same number of bits per word as the number of bits per word comprising control signals from said first and second sets of controllable devices.

49. The method as in claim 48 wherein the command signals from the microprocessor comprise digital words having a greater number of bits per word than the number of bits per word in digital words comprising control signals from said first and second sets of controllable devices.

50. The method as in claim 49 wherein the number of bits per command signal word is 16 and the number of bits per controllable device word is 8.

51. The method as in claim 48 wherein the command signals from the microprocessor comprise digital words having a fewer number of bits per word than the number of bits per word in digital words comprising control signals from said first and second sets of controllable devices.

52. The method as in claim 51 wherein the number of bits per command signals word is 8 and the number of bits per controllable device word is 16.

53. The method as in claim 28 wherein:
said first set of controllable devices include peripheral devices; and
said step of producing said first set of interface control signals includes the step of producing access control signals for controlling access to said peripheral devices.

54. Apparatus as in claim 28 wherein said steps of producing first and second interface control signals include the step of producing a halt/shutdown signal for inhibiting said first and second sets of interface control signals when operation of the microprocessor is stopped.

* * * * *